United States Patent
May

(10) Patent No.: US 11,135,962 B2
(45) Date of Patent: Oct. 5, 2021

(54) MODULAR SYSTEM FOR A ROOM, FOR A LIVING, WORK OR STORAGE AREA, OR FOR OTHER THREE-DIMENSIONAL SPACES

(71) Applicant: HAPPIER CAMPER, INC., Los Angeles, CA (US)

(72) Inventor: Derek M. May, Los Angeles, CA (US)

(73) Assignee: HAPPIER CAMPER, INC., Los Angeles, CA (US)

(*) Notice: Subject to any disclaimer, the term of this patent is extended or adjusted under 35 U.S.C. 154(b) by 220 days.

(21) Appl. No.: 15/999,112

(22) PCT Filed: Feb. 21, 2017

(86) PCT No.: PCT/US2017/018702
§ 371 (c)(1),
(2) Date: Aug. 17, 2018

(87) PCT Pub. No.: WO2017/143335
PCT Pub. Date: Aug. 24, 2017

(65) Prior Publication Data
US 2019/0351805 A1    Nov. 21, 2019

Related U.S. Application Data

(60) Provisional application No. 62/296,821, filed on Feb. 18, 2016.

(51) Int. Cl.
*B60P 3/34* (2006.01)
*A47B 87/02* (2006.01)
(Continued)

(52) U.S. Cl.
CPC ............ *B60P 3/34* (2013.01); *A47B 87/0276* (2013.01); *A47B 91/08* (2013.01); *B65D 21/0213* (2013.01); *B65D 21/083* (2013.01)

(58) Field of Classification Search
CPC ....... B60P 3/34; A47B 87/0276; A47B 91/08; B65D 21/0213; B65D 21/083
(Continued)

(56) References Cited

U.S. PATENT DOCUMENTS 349,646 A * 9/1886 Grigg
2,390,479 A * 12/1945 Walsh .................. F16F 1/54
267/141.3

(Continued)

OTHER PUBLICATIONS

International Search Report and Written Opinion for International Application No. PCT/US2017/018702 dated May 11, 2017.
(Continued)

*Primary Examiner* — Daniel J Troy
*Assistant Examiner* — Timothy M Ayres
(74) *Attorney, Agent, or Firm* — K&L Gates LLP

(57) ABSTRACT

A modular flooring system comprises a modular floor surface and a plurality of stackable, three-dimensional modular interior design components (MIDCs). The modular floor surface can comprise an array of discrete, raised, low-profile, receiving panels that can be rectangular in shape. MIDCs can be securely and interchangeably placed on any group of one or more adjacent unoccupied receiving panel and they can also be stackable, such that various different floor layouts can be created. Each of the MIDCs may comprise a lower surface recess that fits over a group of one or more adjacent raised receiving panels. A first MIDC may have an raised lip on a top surface such that the lower surface recess of a second MIDC fits over, separately and interchangeably, one (or more) of the raised receiving panels and the raised lip on the top surface of the first MIDC. The MIDCs can comprise a storage cube MIDC (square or rectangular cube) as well as specialized MIDCs, such as a commode MIDC, a sink MIDC, a cooler MIDC, and a tile MIDC, etc. In such a manner, a user of the modular flooring
(Continued)

Front Side View of Storage MIDC system could locate the MIDCs on the floor surface and/or stack them to configure a preferred layout. Moreover, the MIDCs could be rearranged later to design a new layout.

18 Claims, 32 Drawing Sheets

(51) Int. Cl.
    *A47B 91/08*     (2006.01)
    *B65D 21/02*     (2006.01)
    *B65D 21/08*     (2006.01)

(58) Field of Classification Search
    USPC .......................................................... 312/107
    See application file for complete search history.

(56) References Cited

U.S. PATENT DOCUMENTS

| | | | | |
|---|---|---|---|---|
| 2,511,949 A * | 6/1950 | Simon | A47B 87/02 | 312/107 |
| 2,883,764 A * | 4/1959 | Stephens | G09B 25/04 | 446/118 |
| 3,289,664 A * | 12/1966 | Hewitt | A47B 77/08 | 126/37 R |
| 3,305,982 A * | 2/1967 | Steele | E04B 2/18 | 52/90.1 |
| 3,414,986 A * | 12/1968 | Stassen | G09B 19/02 | 434/195 |
| 3,472,219 A * | 10/1969 | Roy | A47B 77/022 | 126/37 R |
| 3,577,671 A * | 5/1971 | Woollett | A63H 33/086 | 446/124 |
| 3,811,728 A * | 5/1974 | Redemske | A47B 87/00 | 297/440.14 |
| 3,823,992 A * | 7/1974 | Corbett | A47B 77/02 | 312/201 |
| 4,027,892 A * | 6/1977 | Parks | B60P 7/0815 | 410/3 |
| 4,086,859 A * | 5/1978 | Dondero | A47B 11/00 | 108/142 |
| 4,483,499 A * | 11/1984 | Frank | B64D 9/00 | 244/118.1 |
| 4,672,898 A * | 6/1987 | Davidson | A47B 23/02 | 108/139 |
| 4,925,140 A * | 5/1990 | Camarota | A47B 13/021 | 248/188 |
| 4,974,386 A * | 12/1990 | Eriksson | E04B 1/3483 | 312/111 |
| 5,121,891 A * | 6/1992 | Goldsmith | F16B 9/052 | 248/188.8 |
| 5,301,376 A * | 4/1994 | Herbert | A47K 1/02 | 220/379 |
| 5,597,193 A * | 1/1997 | Conner | B60P 7/0892 | 224/404 |
| 5,599,055 A * | 2/1997 | Brown | B60P 7/14 | 296/37.6 |
| 5,676,251 A * | 10/1997 | Credle, Jr. | A63H 33/086 | 206/501 |
| 5,683,157 A * | 11/1997 | Peterson | A47J 33/00 | 312/100 |
| 5,785,530 A * | 7/1998 | Smith | G09B 25/00 | 434/219 |
| 5,788,310 A * | 8/1998 | McKee | B60R 13/01 | 114/75 |
| 5,830,032 A * | 11/1998 | Campbell | A63H 33/04 | 446/128 |
| 6,145,912 A * | 11/2000 | Rice | B60N 2/01558 | 248/503.1 |
| 6,176,657 B1 * | 1/2001 | Romph | B60P 7/0892 | 410/121 |
| 6,193,340 B1 * | 2/2001 | Schenker | A47B 47/0075 | 312/108 |
| 6,270,137 B1 * | 8/2001 | Minix | B60N 2/01508 | 296/24.3 |
| 6,739,281 B1 * | 5/2004 | Grimes | B63B 29/06 | 114/364 |
| 6,820,950 B1 * | 11/2004 | Sun | A47B 47/042 | 312/108 |
| 6,877,824 B2 * | 4/2005 | Winkless | A47B 87/008 | 312/107 |
| 7,137,764 B2 * | 11/2006 | Johnson | B60P 3/07 | 410/101 |
| 7,231,740 B2 * | 6/2007 | Jirele | A63J 1/00 | 108/11 |
| 7,784,885 B2 * | 8/2010 | Steiger | B60P 3/14 | 108/106 |
| 7,908,802 B2 | 3/2011 | Frederiksen | | |
| 8,322,354 B2 * | 12/2012 | Parker | A45D 33/20 | 132/287 |
| 8,360,363 B2 * | 1/2013 | Gonnsen | B64D 11/0696 | 244/118.5 |
| 8,516,971 B1 * | 8/2013 | Natoce | B63B 17/00 | 114/85 |
| 8,529,266 B1 * | 9/2013 | Akin | G09B 19/02 | 434/191 |
| 8,567,149 B2 | 10/2013 | Kuzmin | | |
| 9,078,515 B2 * | 7/2015 | Keragala | A47C 13/005 | |
| 9,101,212 B2 | 8/2015 | De Roeck | | |
| 9,526,333 B1 * | 12/2016 | Nielson | A47B 47/0091 | |
| 10,017,252 B2 * | 7/2018 | Jobst | A61G 3/00 | |
| 10,112,120 B2 * | 10/2018 | Weidetz | A63H 33/042 | |
| 10,196,826 B1 * | 2/2019 | Rosan | E04F 15/02452 | |
| 10,557,275 B2 * | 2/2020 | Lescord | E04G 11/36 | |
| 2004/0226492 A1 * | 11/2004 | Carter | A47B 87/02 | 108/158.12 |
| 2007/0094979 A1 * | 5/2007 | Richardson | E04B 1/34321 | 52/578 |
| 2007/0145864 A1 | 6/2007 | Freedman | | |
| 2011/0045733 A1 * | 2/2011 | Saigo | A63H 33/086 | 446/125 |
| 2013/0217296 A1 * | 8/2013 | Widjaja | A63H 33/101 | 446/124 |
| 2017/0311735 A1 * | 11/2017 | Ceulebroeck | E04F 15/02038 | |
| 2019/0335923 A1 * | 11/2019 | Van Ceulebroeck | F16B 5/00 | |
| 2020/0154686 A1 * | 5/2020 | Lepek | G06K 9/00362 | |

OTHER PUBLICATIONS

ADAPTIV™, Endless Possibilities, Happier Camper, Nov. 2, 2015, accessed at https://web-beta.archive.org/web/20151102181328/http://happiercamper.com:80/adaptiv/.

* cited by examiner

Front Side View of Storage MDC

Storage MDC with Lid

Storage MDC with Cushion

Fig. 21 Storage MDC with Countertop

Storage MIDC with Table Stand

Table MIDC

Bench MIDC

Sink MIDC

Tile MDC on Receiving Floor Panel

Tile MDC on Storage MDC

Commade MIDC on Tile MIDC on Receiving Floor Panel

Modular System Layout

MODULAR SYSTEM FOR A ROOM, FOR A LIVING, WORK OR STORAGE AREA, OR FOR OTHER THREE-DIMENSIONAL SPACES

PRIORITY

This application claims the benefit of U.S. Provisional Application Ser. No. 62/296,821, entitled "MODULAR SYSTEM FOR A ROOM, FOR A LIVING, WORK, OR STORAGE AREA, OR FOR OTHER THREE-DIMENSIONAL SPACES" filed Feb. 18, 2016, by inventor Derek M. May, the contents of which is incorporated herein by reference in their entirety and for all purposes.

BACKGROUND

Many people enjoy camping, particularly in recreational vehicles (RVs). RVs, however, usually have a fixed layout for the living area.

SUMMARY

In one general aspect, the present invention is directed to a modular flooring system that comprises a modular floor surface and a plurality of stackable, three-dimensional modular interior design components (MIDCs). The modular floor surface can comprise an array of discrete, raised, low-profile, receiving panels that can be rectangular (e.g., square) in shape. MIDCs can be securely and interchangeably placed on any unoccupied group of one or more receiving panels and they can also be stackable, such that various different floor layouts can be created. Each of the MIDCs may comprise a lower surface recess that fits over a group of one or more raised receiving panels. In addition, one of the MIDCs, a "first" MIDC, may have an raised lip on a top surface such that the lower surface recess of a "second" MIDC fits over, separately and interchangeably, one (or more) of the raised receiving panels and the raised lip on the top surface of the first MIDC. The MIDCs can comprise a storage cube MIDC (square or rectangular cube) as well as specialized MIDCs, such as a commode MIDC, a sink MIDC, a cooler MIDC, and a tile MIDC, etc.

In such a manner, a user of the modular flooring system could locate the MIDCs on the floor surface and/or stack them to configure a preferred layout. Moreover, the MIDCs could be rearranged later to design a new layout. Also, the second layout could have more or fewer MIDCs than the first layout, and/or different MIDCs. Still further, the modular floor surface could be installed on a payload surface of a vehicle, such as the interior of a camper or RV, so that the user can configure the modular layout as desired, thereby giving the user extended versatility for their camper or RV or other location where the modular floor system is used. These and other benefits of the present invention will be apparent from the description that follows.

DESCRIPTION OF THE FIGURES

Various embodiments of the present invention are described herein by reference to the following figures, wherein.

DESCRIPTION

In one general aspect, the present invention is directed to a modular system comprising a modular floor surface and a plurality of modular interior design components (MIDCs) that can be situated thereon to define a living or work space, etc., particularly for (but not limited to) a vehicle, such as campers or RVs. The modular floor surface may comprise an array of raised, storage unit receiving panels on which one of the MIDCs may be placed. For example, a MIDC may be placed at any available (e.g., unoccupied) raised receiving panel of the array, e.g., a panel with nothing disposed on the top surface thereof. Also, the MIDCs may be stackable. For example, a first MIDC can be stacked on top of a second MIDC such that the bottom surface of the first MIDC is disposed on the top surface of the second MIDC; the second MIDC could be placed on modular flooring surface or on top of a third MIDC, and so on. A variety of different MIDCs may be used such as, for example, a basic storage cube, a commode, a sink, a tile, a cooler, a stove, a counter or an oversized cube, etc. as described in more detail below. An MIDC may be cube shaped, such as a square cube or a rectangular cube. A rectangular cube is a cube that does not comprise six surfaces of identical area. In other words, the surface area of a first surface of the rectangular cube may be different from the surface of a second surface of the rectangular cube. In contrast, the surface areas of the six surfaces of a square cube are identical. Polyhedron shaped MIDCs may also be used, depending on the shape of the receiving panels of the modular floor surface. A user of the modular system may use the modular system to create various desired modular layouts, such as a layout for a room. A layout may refer to, for example, a specific configuration of MIDCs disposed on the modular floor surface or other instances of MIDCs. Some layouts may include MIDCs and additional interior design components.

Figure 1:
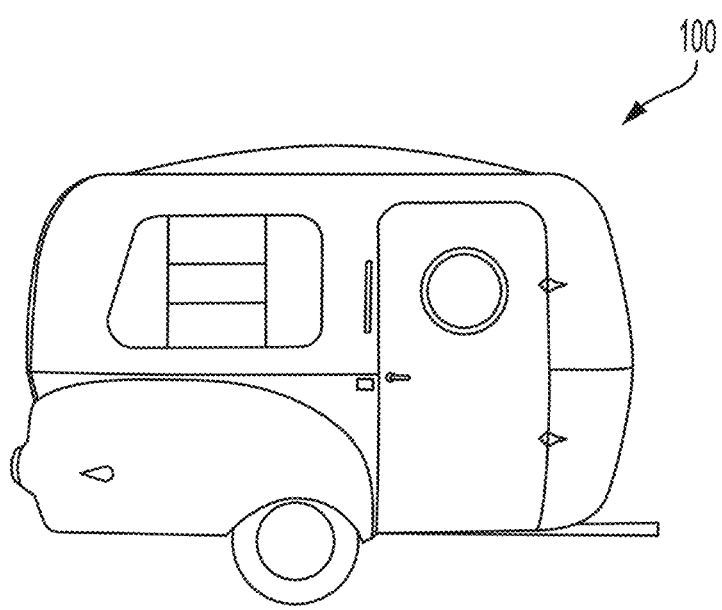
FIG. 1 is an illustration of a vehicle in which the modular system of the present invention may be implemented.

FIG. 1 provides a side view of a vehicle 100 in which a user may implement the modular system. In some embodiments, the vehicle 100 may be an RV, truck, utility vehicle, or any other suitable vehicle. An RV may refer to, for example, a motor home, camper, travel vehicle 100 or caravan. The vehicle 100 may comprise one or more wheels, windows and doors. In some embodiments, the vehicle 100 may be a vehicle 100 that includes an extension to connect the vehicle 100 to another vehicle. The vehicle 100 may comprise a payload surface that may act as a substrate for the modular floor surface. In other words, the modular floor surface may be disposed on the payload surface of the vehicle 100. For example, where the vehicle 100 is an RV, the payload surface may be the bottom surface of the interior cabin of the RV; where the vehicle 100 is a pickup truck, the payload surface may be the lower surface of the cargo area; etc. Therefore, the dimensions of the modular floor surface may be sized to fit the payload surface of the vehicle 100.

The vehicle 100 should also be large enough to accommodate several MIDCs that are located on the modular floor surface or stacked on other MIDCs.

Figure 2:
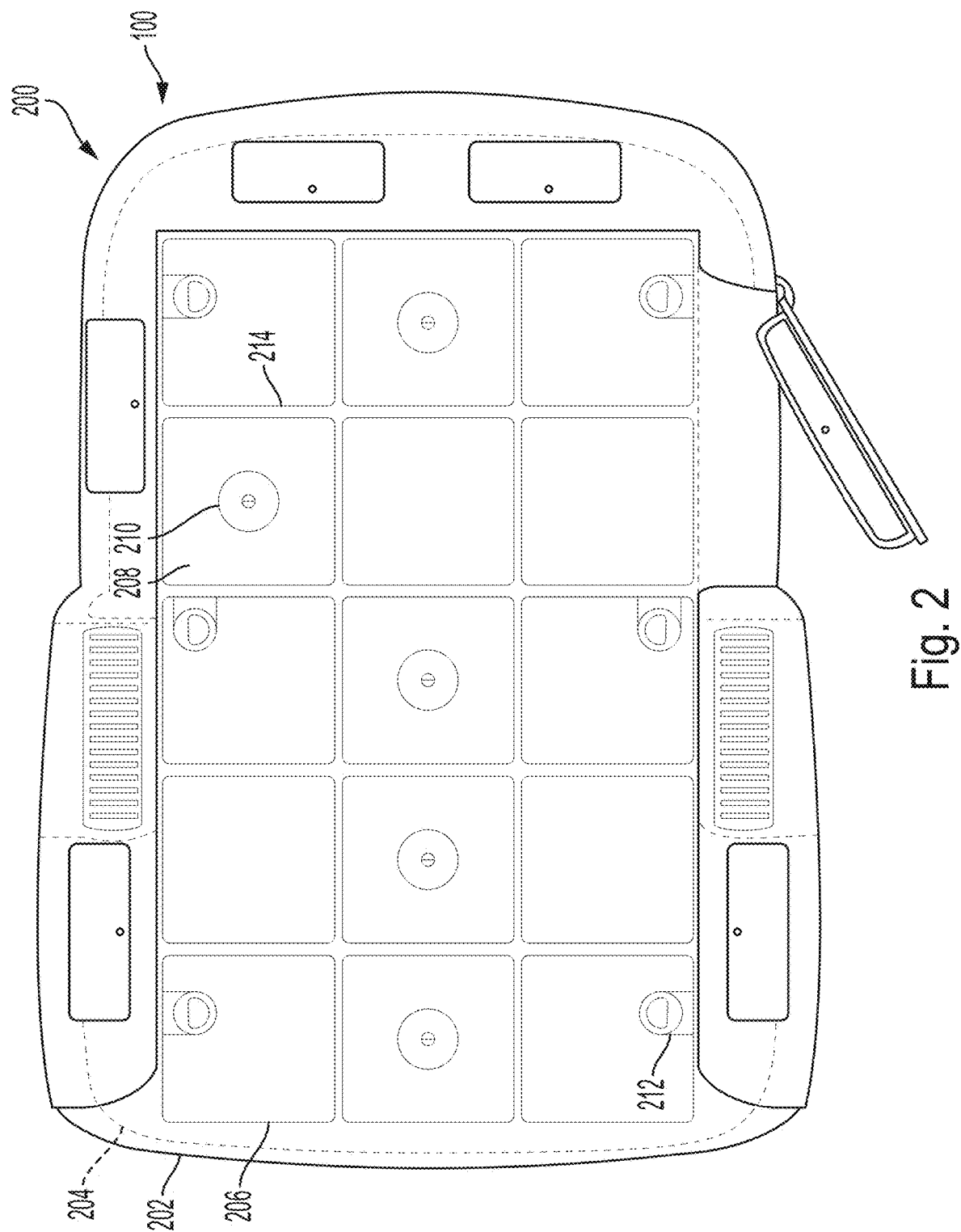
FIGS. 2-3 are views of a modular floor surface according to various embodiments of the present invention.
Figure 3:
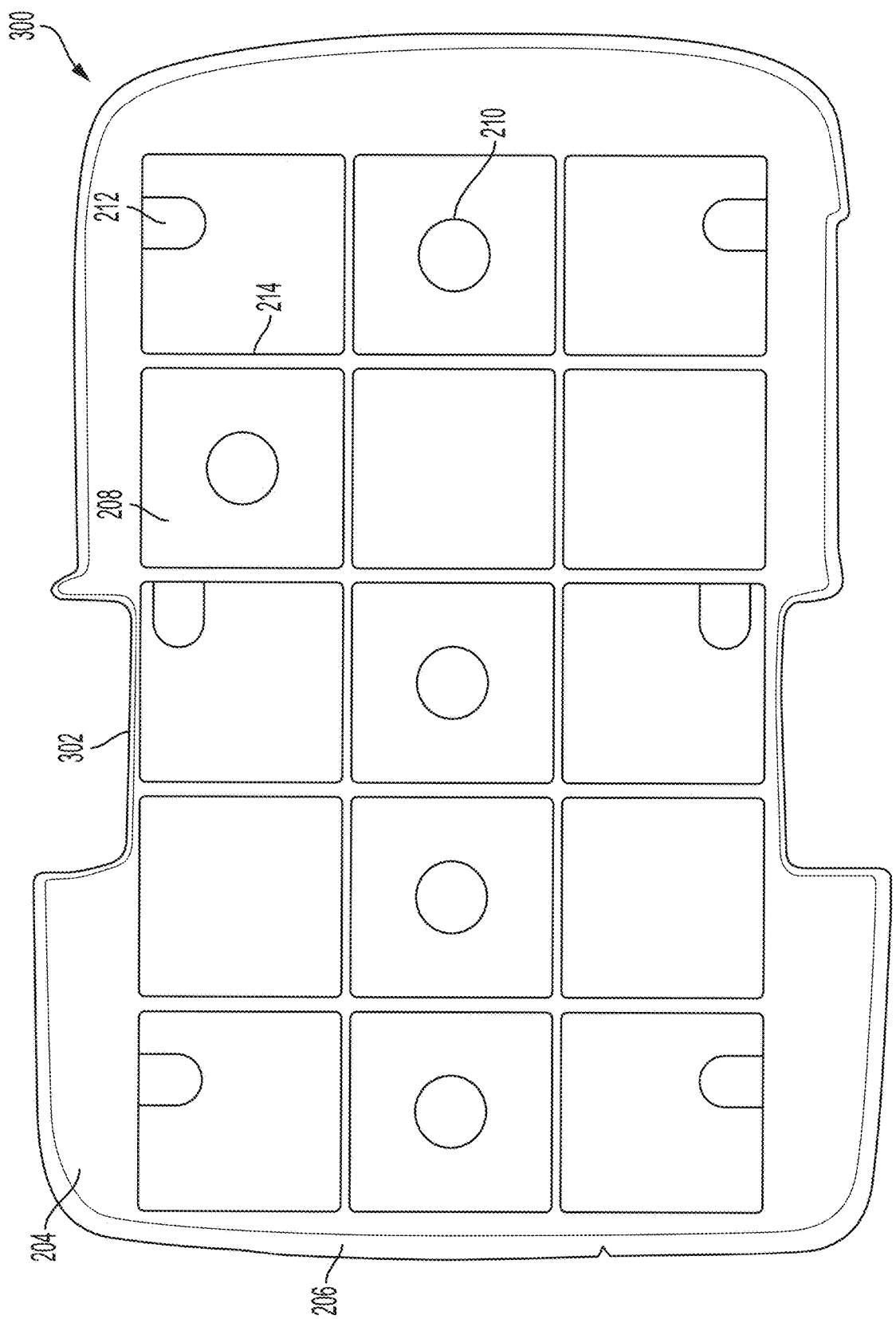

FIGS. 2 and 3 depict a top view 200 of the modular floor surface 204 according to various embodiments of the present invention. In FIG. 2, the modular floor surface 204 is disposed on the payload surface 202 in the interior of the vehicle 100. FIG. 3 is a view 300 of the modular floor surface 204 by itself. Any suitable material may be used to construct the modular floor surface 204, such as 1.5" thick honeycomb fiberglass, or any other material that possesses a suitable structural strength and is sufficiently low in weight. Accordingly, the modular floor surface 204 may be made of suitable plastics, polymers, or rubbers. The modular floor surface 204 comprises an array 206 of storage unit receiving panels 208. Each of the storage unit receiving panels 208 may be configured to receive an MIDC, as described further below. In the illustrated embodiment, the panels 208 are squares, although in other embodiments they could be other shapes with the MIDCs correspondingly shaped to be located thereon. An edge 214 of a receiving panel 208 may define a groove or channel. The groove or channel may be formed on the modular floor surface 204 to demarcate a boundary between any two panels 208. The array 206 may comprise a predetermined number of columns and rows of receiving panels 208 to form a grid pattern in various embodiments. In other embodiments, the array 206 of storage unit receiving panels may form another suitable pattern. A combination of grooves or channels may demarcate a boundary between two adjacent rows or two adjacent columns. The receiving panels 208 are sized to receive at least some or all of the MIDCs. That is, as explained further below, some of the MIDCs have bottom surfaces that are sized to snugly fit over one of the raised panels 208 to secure the MIDC to the floor surface 204 with a friction fit. Other mechanisms to secure a MIDC to the floor surface can also be used. For example, the dimensions of the length and width dimensions of the raised panels 208 may be just under 20" by 20" (its height may be about 1" or so), and the bottom surfaces of the MIDCs can be slightly larger (e.g., 20" by 20") to fit over the raised panels 208. As described further below, the MIDCs can have different dimensions. The array 206 of storage unit receiving panels may also comprise a first receiving panel 208 and a second receiving panel 208 of corresponding different dimensions. In other words, the array 206 may comprise two or more configurations of dimension parameters of the receiving panels 208.

FIGS. 4 to 9 disclose various views of one configuration of a MIDC 402 according to various embodiments of the present invention. The modular type of MIDC 402 shown in FIGS. 4 to 9 is a basic storage MIDC 402a. Various other modular variants or types of MIDCs could also be used, as described herein. The basic storage MIDC 402a is a cube shaped component with a top surface 406, four side surfaces 408, and a bottom surface. In some embodiments, the length dimensions of the basic storage MIDC 402a equals the width dimensions of the basic storage MIDC 402a, but in other embodiments, any one of the length, width, or height dimensions can be different from another one of the length, width, or height dimensions. The MIDCs can be constructed of suitable highly-durable and weather-resistant molded materials by a suitable molding process, such as, for example, rotational, injection, blow and compression molding as well as thermoforming.

Figure 4:
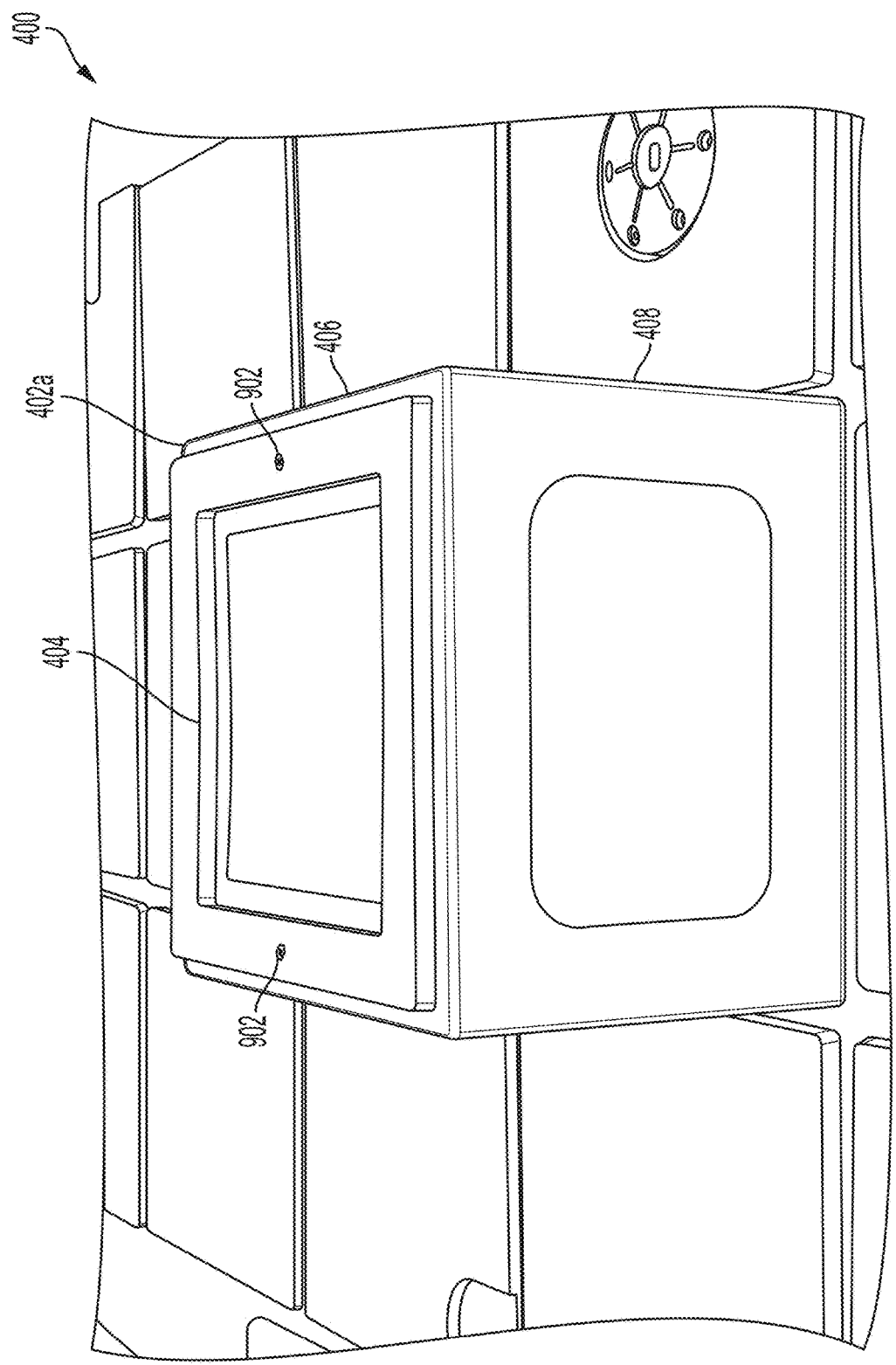
FIGS. 4-10 show various aspects of a storage cube MIDC according to various embodiments of the present invention.

FIG. 4 shows a view 400 of the top surface 406 and the front side surface 408 of the basic storage MIDC 402a placed on a receiving panel 208 in a friction fit, as previously described. The top surface 406 comprises a raised interior surface 404, such as a raised square frame as shown in FIG. 4, for engaging the bottom surface of another MIDC 402 in a friction fit for stacking MIDCs 402, as described herein. The raised square frame may encircle an aperture of the top surface 406. The aperture permits access to a storage compartment of the basic storage MIDC 402a such that a user of the modular system can place items within the interior of the basic storage MIDC 402a. In other words, the basic storage MIDC 402a may be hollow inside such that the interior of the MIDC 402 comprises a space. The aperture may be covered by a top door that is configured to open and close and is mounted to the basic storage MIDC 402a by a hinge. In embodiments, the front side surface 408 comprises another aperture on the front side surface 408, which may also be used as an opening to the storage compartment. A MIDC 402 may comprise a side door configured to open and close. The side door may be located on a side surface 406 and configured to cover the aperture comprising the storage compartment of the basic storage MIDC 402a. The side door may be adjustable to the open and closed configurations with a stainless hinge acting as a pivot of the door. The storage compartment or aperture can be accessed when either of the top or side doors is in the open configuration. In embodiments, either of side or top doors may be closed and locked by, for example, applying a rotational force to snap the side or top door and locking the side or top door with a snap closure mechanism. In some embodiments, subcomponents for some types or modular variants of MIDCs 402 such as, for example, plumbing components for a sink MIDC, may be located within the interior of the MIDC 402, as described further below.

Figure 5:
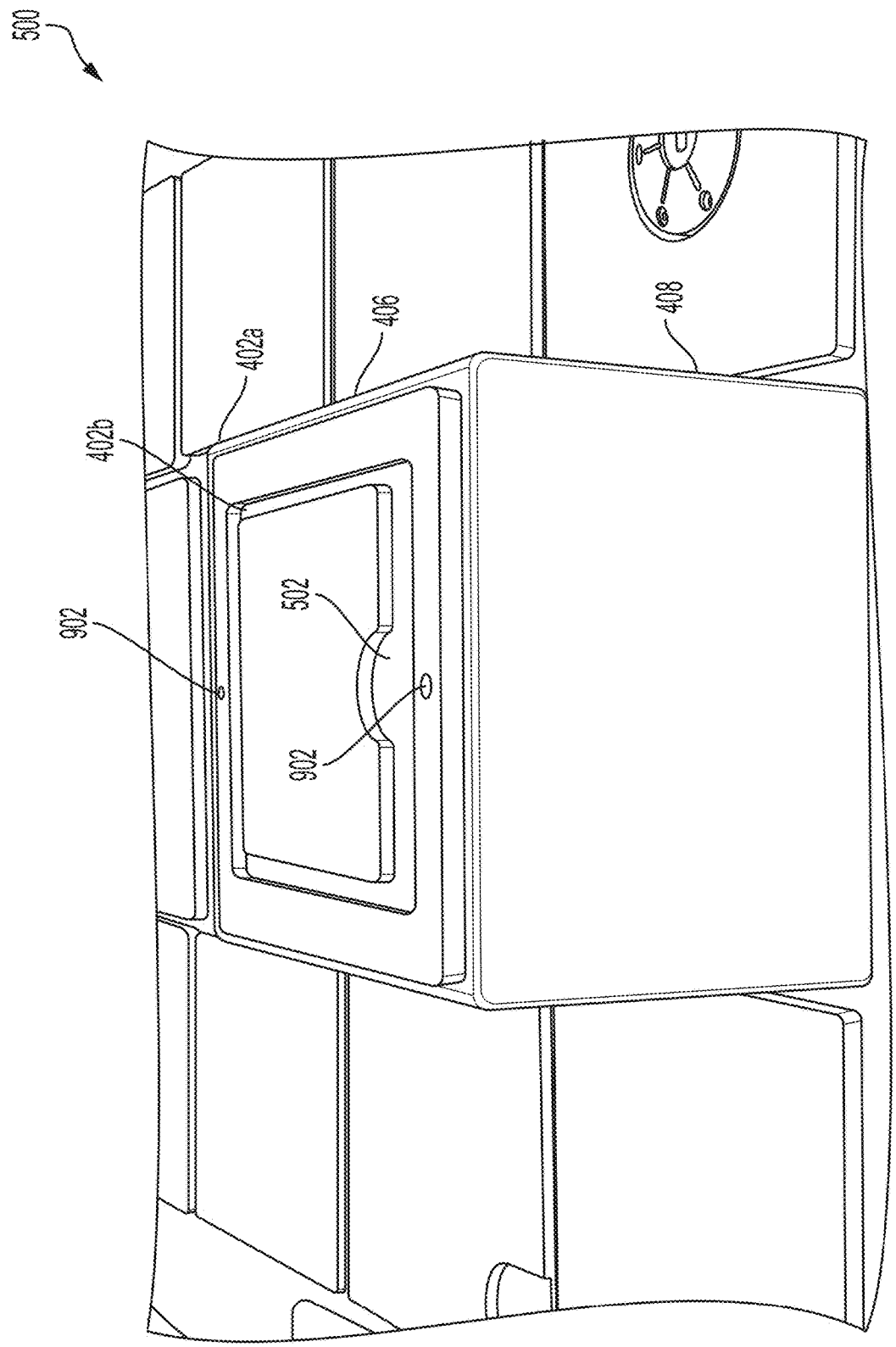

In the view 500 of FIG. 5, the basic storage MIDC 402a may have a lid MIDC 402b placed on top of the aperture of the top surface 406. In some embodiments, the lid MIDC 402b can comprise a lip 404 around the edges of the aperture of the top surface 406 of the basic storage MIDC 402a. The lip 404 may be configured to restrain the lid MIDC 402b in a position, or to support an item or material disposed on the top surface 406 of the basic storage MIDC 402a. In embodiments, the lid MIDC 402b comprises a grasping surface 502, such as a raised area on top of the lid MIDC 402b with indentations for a user to grasp the lid MIDC 402b. The lid MIDC 402g may be detachable or removable from the basic storage MIDC 402a.

Figure 6:
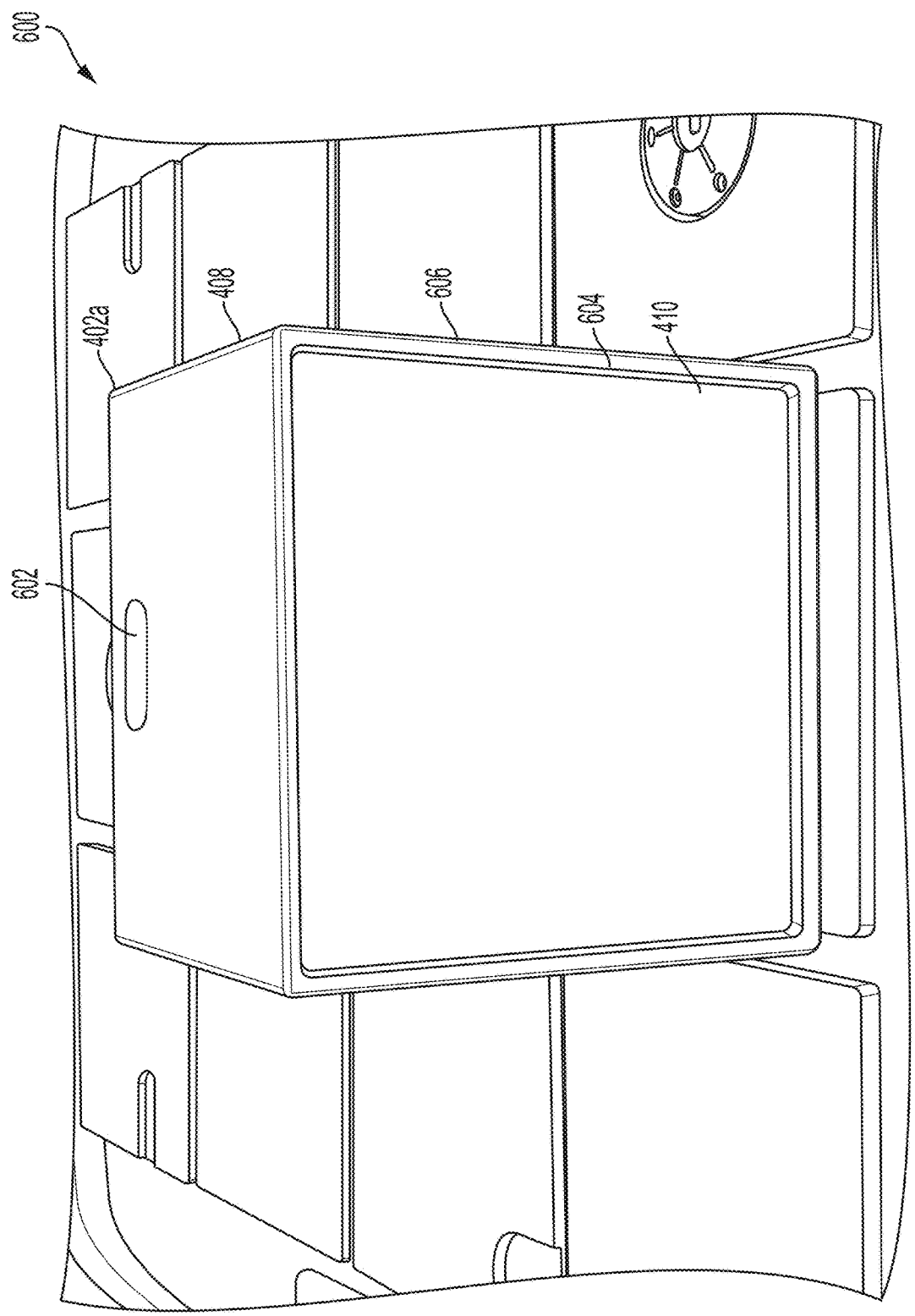

FIG. 6 shows a view 600 of the bottom surface 410 and the front side surface 408 of the basic storage MIDC 402a resting on a panel 208. In various embodiments, the bottom surface 410 comprises a square recessed interior surface 604. The recessed interior surface 604 may be another suitable shape that matches the shape of the corresponding receiving panel 208. The interior recesses 604 can be defined by extended perimeter edges 605 of the MIDC 204, where the edges 605 fit into the channels 214 defined by the floor surface 204. The dimensions of the square recessed interior surface 604 can correspond to one or more of the dimensions of the raised receiving panel 208 or the raised interior surface 404 of a MIDC 402. Specifically, the height of the recessed interior surface 604 may be designed to match the height of the raised panel 208 or the raised interior surface 404. In other words, the bottom surface 410 is sized to snugly fit over a raised panel 208 or snugly fit over the top surface 406 of another MIDC 402. Thus, the corresponding dimensions of the respective surfaces enable placing a first MIDC 402 on a panel 208 and stacking various additional MIDCs 402 on top of the first MIDC 402. In some embodiments, the bottom surface 410 of the basic storage MIDC 402a may possess any suitable dimensions as long as the dimensions correspond to the dimensions of the receiving panels 208 and other MIDCs 402 to enable the recessed interior surface 604 to engage the raised interior surface 404 of another MIDC 402 or a raised panel 208. Engaging the recessed interior surface 604 to the raised interior surface 404 based on a friction fit couples the basic storage MIDC 402a to the other MIDC 402 such that the other MIDC 402 is stacked on top of the basic storage MIDC 402a. As described previously, this process may be repeated to stack additional MIDCs 402.

Similarly, engaging the recessed interior surface 604 to the raised panel 208 couples the basic storage MIDC 402a to the raised panel such that the basic storage MIDC 402a is placed on top of the raised panel 208. In addition, as shown in FIG. 6, the bottom surface 410 of the MIDCs 402 may comprise a peripheral ridge 605 to engage with a groove or channel on the floor surface 204 around a panel 208 to secure the MIDCs 402 to the floor surface 204. Therefore, when a first MIDC 402 is placed on a panel 208 next to a second MIDC 402 placed on another panel 208, the peripheral ridge 605 of the first MIDC 402 may engage the peripheral ridge 605 of the second MIDC 402 in a friction fit so that the first and second MIDCs 402 fit snugly adjacent to each other. As previously described, the height of the recessed interior surface 604 may be designed to match the height of the raised panel 208 or the raised interior surface 404. Securing may refer to, for example, restraining an MIDC 402 to hold the MIDC 402 in a position relative to a receiving panel 208 such that the MIDC 402 does not move (or moves only minimally) related to the floor surface 204. Additionally, in some embodiments, the modular floor surface 204 may comprise a coating that provides gripping ability between the MIDCs 402 and the modular floor surface 204 to enhance securement of the MIDCs 402 to the storage unit receiving panels 208. In embodiments, the side surface 408 shown in FIG. 6 comprises a handle aperture 602 that a user of the modular system may use for grasping and moving the basic storage MIDC 402a. For example, a user can grasp and move the basic storage MIDC 402a to place the basic storage MIDC 402a on top of a raised panel 208.

Figure 7:
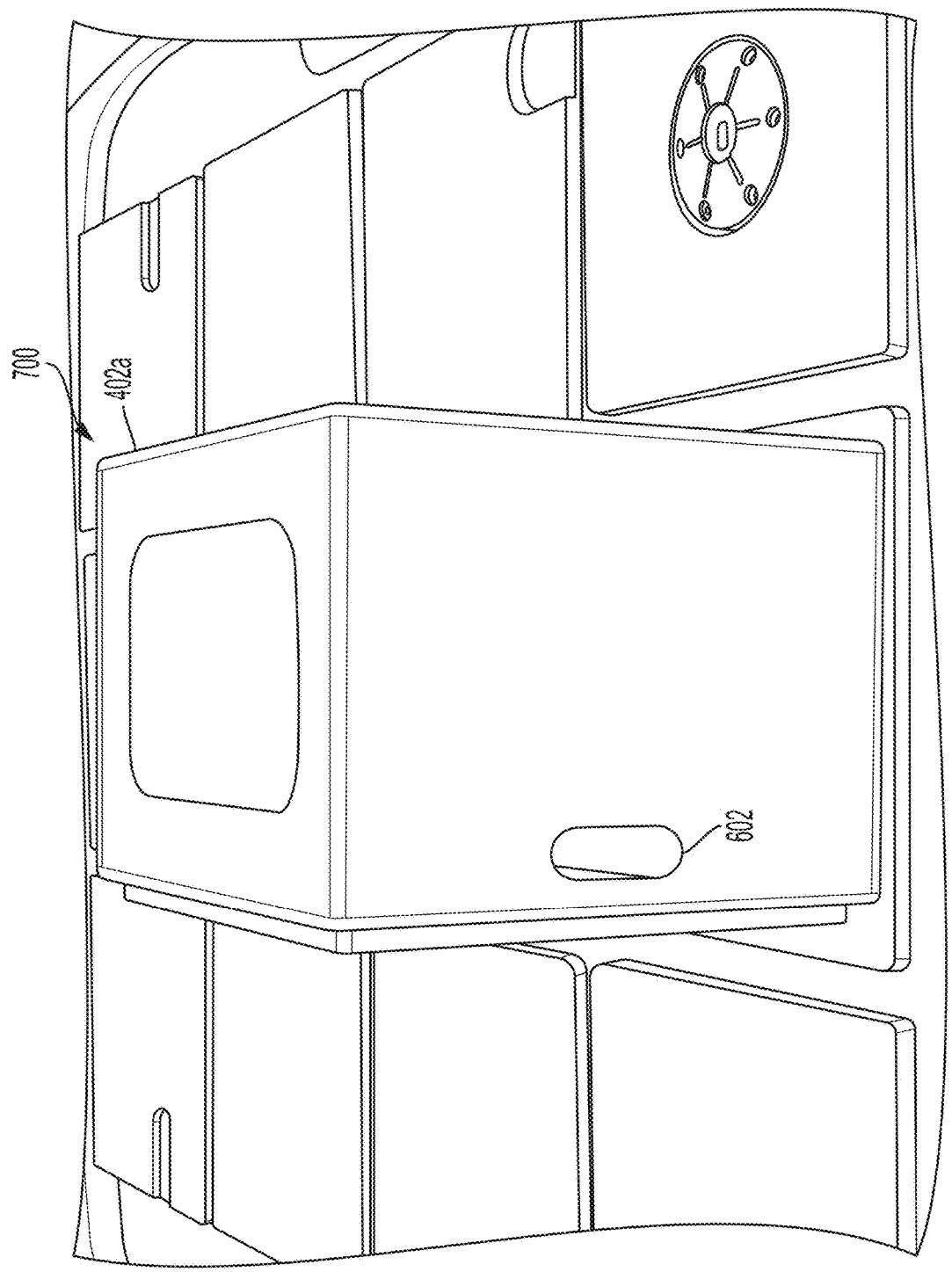

FIG. 7 shows a view 700 of the left side surface 408 and the top surface 406 of the basic storage MIDC 402a resting on a panel 208. The left side surface 406 may comprise the handle aperture 602, as previously described in FIG. 6. In some embodiments, a user may use grasp the handle aperture 602 to move the basic storage MIDC 402a to a different receiving panel 208 of the array 206. Therefore, the handle aperture enables convenient placement, moving, and removal of MIDCs 402 from raised panels 208. As shown in the view 700, the height of the basic storage MIDC 402a exceeds the length and width of the basic storage MIDC 402a. As previously described, the height, length and width dimensions of the basic storage MIDC 402a can be any suitable dimensions so long as the dimensions of the bottom surface 410 correspond to the dimensions of the receiving panels 208 and other MIDCs 402.

Figure 8:
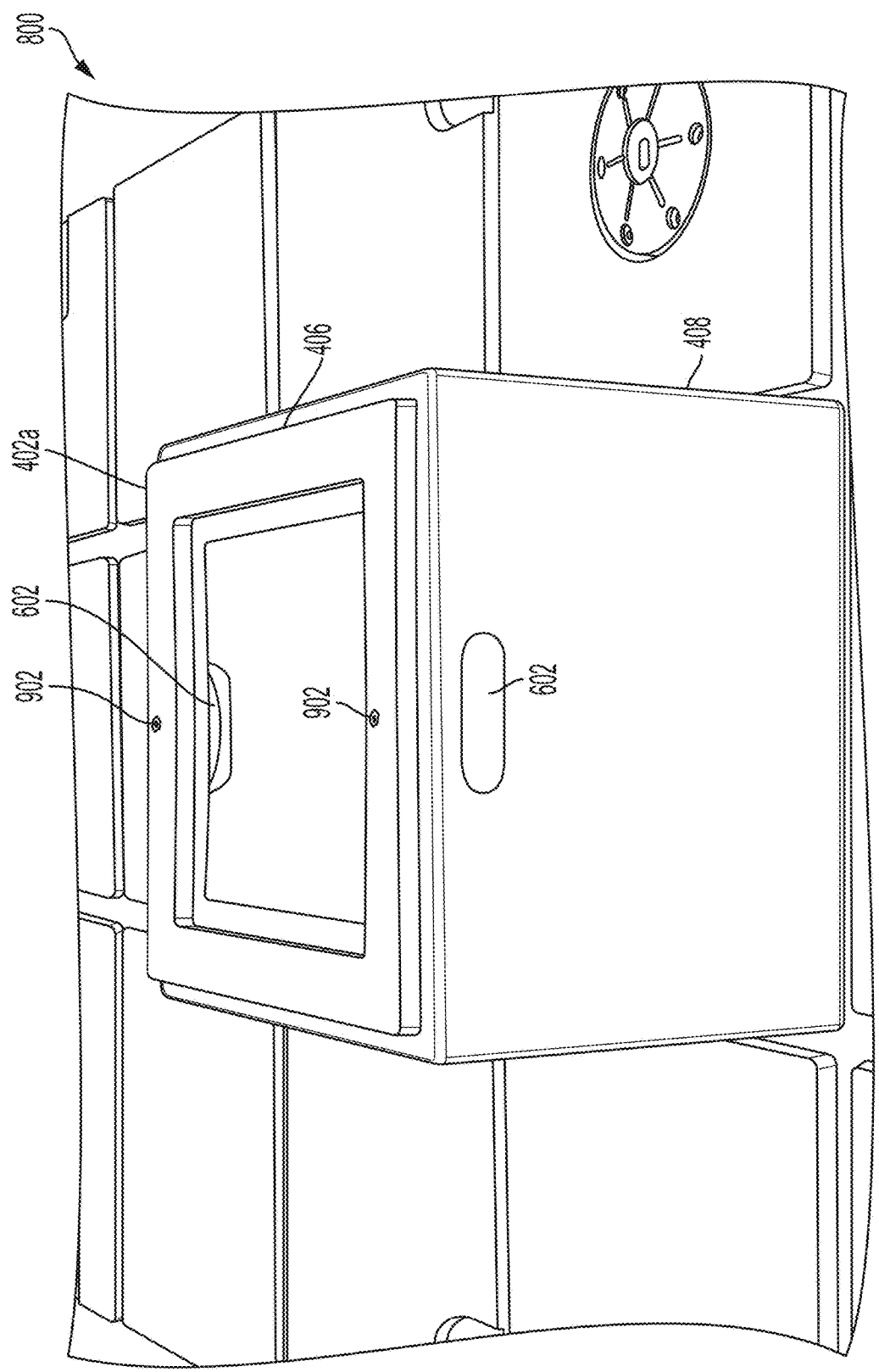
Figure 9:
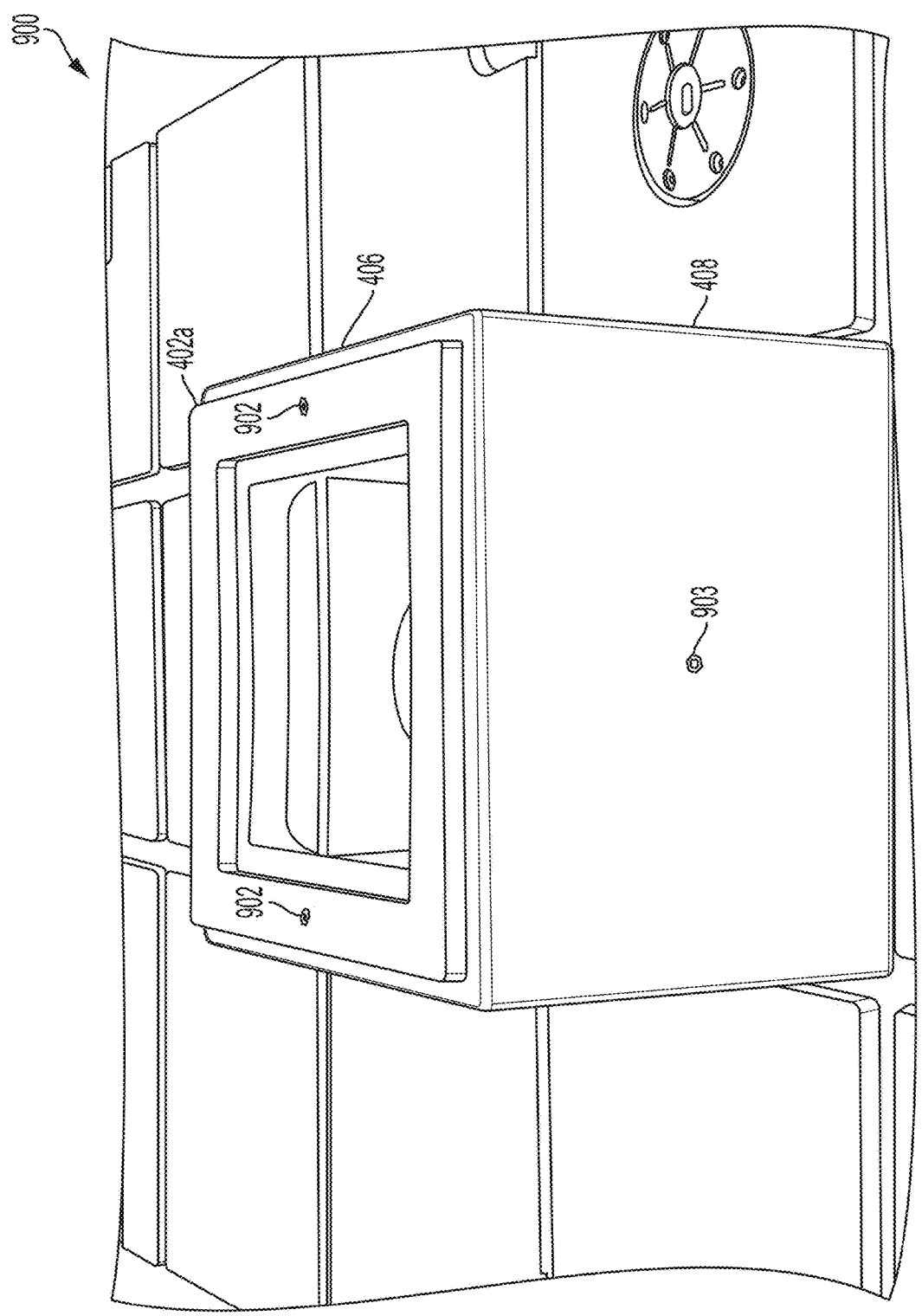

FIG. 8 shows a view 800 of the right side surface 408 and the top surface 406 of the basic storage MIDC 402a. The right side surface 408 may also comprise a handle aperture 602 that a user may use for grasping and moving, as previously described. As shown in the view 800, there can be left and right handle apertures 602 located at opposing corresponding locations on left and right side surfaces 408, respectively. The left and right handle apertures 602 can receive the hands of a user, respectively, such that the user may securely grasp or move the basic storage MIDC 402a. In some embodiments, the left and right handle apertures 602 can be located at any suitable location on the left and right side surfaces 408, respectively. FIG. 9 shows a view 900 of the back side surface 408 and the top surface 406 of the basic storage MIDC 402a. As shown in FIGS. 4, 5, 8, and 9, in embodiments, the basic storage MIDC 402a may comprise receiving apertures 902, 903 such as embedded nuts. In FIG. 9, two upper receiving apertures 902 are located at opposing edges of the raised interior surface 404 of the top surface 406 and one receiving aperture 903 is located at the center of the back side surface 408. The receiving apertures 902, 903 can be configured to receive bolts, screws, or other threaded fasteners. The threaded fasteners may be inserted downward through the bottom surface 410 of a MIDC 402 that is disposed or stacked on top of the basic storage MIDC 402a into the upper apertures 902 to secure and couple the MIDC 402 to the basic storage MIDC 402a. Thus, the upper receiving apertures 902 may be for more secure stacking of MIDCs 402. Furthermore, in embodiments, the side aperture 903 located at the center of the back side surface 408 is for securing the basic storage MIDC 402a to a wall of the vehicle 100 or other structure, such as, for example, a side surface 408 of another MIDC 402. In some embodiments, more than two upper receiving apertures 902 on the top surface 406 may be provided for more secure coupling. Additional side receiving apertures 903 may be provided in the back side surface 408, other side surfaces 408, or bottom surface 410 of the basic storage MIDC 402a.

In some embodiments, each of the MIDCs 402 may comprise one or more fastener components for securely attaching a first MIDC 402 to an adjacent second MIDC 402. In various embodiments, the fasteners may be lateral or longitudinal such that the fasteners can be configured to attach the first MIDC 402 to second MIDC 402 where the second MIDC 402 is located adjacent in any of four directions (i.e. to the left, right, above, or below) relative to the first MIDC. The first MIDC 402 could also be fastened to a wall of a vehicle 100 by a fastener. In other embodiments, the fastener components can be embedded into the walls or floor of the vehicle 100. For example, the fastener components can be embedded into the modular floor surface 204, directly into the payload surface 202, or into a different area of the floor of the vehicle 100. As previously described, each MIDC 402 may comprise one or more receiving apertures 902, 903. The receiving apertures 902, 903 may be for receiving and securing the fastener components. In embodiments, for receiving and securing by the receiving apertures 902, 903, the fastener components are inserted and rotated into the receiving apertures 902, 903. Rotating may refer to, for example, tightening the fastener into a receiving aperture 902, 903. This insertion and rotation enables a more secure coupling of the first and second MIDC 402. The fastener components may be any suitable fastener, such as screws, bolts, clamps, or suitable threaded fasteners. In some embodiments, the receiving apertures 902, 903 may be embedded nuts for receiving and securing thumb screws. As previously described, the receiving apertures 902, 903 can be located at any desirable location on each MIDC 402. In other embodiments, the embedded fastener components may be inserted into or attached to the receiving apertures 902, 903 of MIDCs 402 by directly rotating the MIDCs 402 into embedded fastener components. The fastener components may be removable or semi-permanent.

Figure 10:
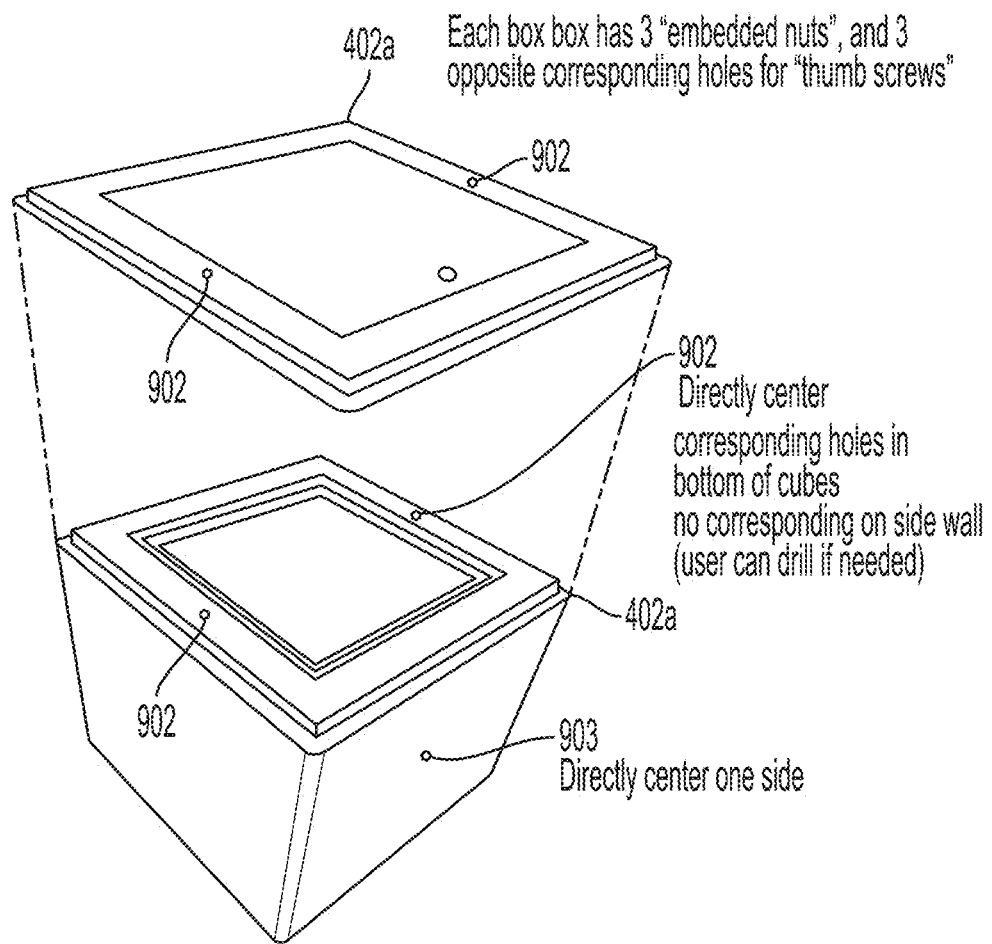

FIG. 10 is an illustration 1000 of stacking MIDCs 402 such that a first MIDC 402 is coupled to a second MIDC 402

(with the second MIDC 402 shown in shadow). As previously described, each MIDC 402 in FIG. 10 is a cube shaped component with a top surface 406, four side surfaces 408, and a bottom surface 410. The top surface 406 of the first MIDC 402 may be configured to engage the bottom surface 410 of the second MIDC 402 to couple the first MIDC 402 to the second MIDC 402. Thus, such cube-shaped MIDCs 402 may be stackable. Additionally or alternatively, in some embodiments, the raised interior surface 404 is a tiered raised interior surface 404 and the recessed interior surface 604 is a tiered recessed interior surface 604. The dimensions of the tiered raised surface 404 may correspond or equal the dimensions of the tiered recessed surface 604 such that the tiered raised surface 404 and the tiered recessed surface 604 may engage each other in a friction fit. Engaging in a friction fit is for snugly disposing the bottom surface 410 of the second MIDC 402 on the top surface 406 of the first MIDC 402 so that the second MIDC 402 is stacked on the first MIDC 402. In other embodiments, the surface configurations may be reversed such that the bottom surface 410 of the second MIDC 402 comprises a protruding interior surface similar to the raised interior surface 404 and the top surface 406 of the first MIDC 402 comprises the recessed interior surface 604. In such embodiments, the protrusion of the interior surface can snugly engage the raised interior surface 404 in a friction fit such that the second MIDC 402 is stacked on top of the first MIDC 402. Therefore, in a reversed surface configuration, MIDCs 402 may still be stacked based on the protruding interior surface of the bottom surface 410 of the second MIDC 402 engaging the recessed interior surface 604 of the top surface 406 of the first MIDC 402. As previously described, each MIDC 402 may comprise one or more receiving apertures 902 for more secure coupling.

In various embodiments, other mechanisms may be used to secure a MIDC 402 to a particular position. For example, magnets may be used to align and engage the MIDC 402 to a receiving panel 208 or another MIDC 402. In some embodiments, a first MIDC 402 can comprise a first magnet arranged in a first magnetic orientation and a second MIDC 402 can comprise a second magnet arranged in a second magnetic orientation. The first and second magnetic orientations may be opposing magnetic polarities such that the first and second MIDCs 402 experience a magnetic attractive force to secure and couple the first and second MIDCs 402 together. In embodiments, a layout of MIDCs 402 may be configured such that each MIDC 402 comprises a magnet of opposing magnetic polarity to each adjacent MIDC 402. Therefore, the layout of MIDCs 402 may be a checkboard pattern of magnetic polarities. Similarly, each receiving panel 208 may comprise a magnet of opposing magnetic polarity to the MIDC 402 immediately disposed on top of the receiving panel 208. The magnets may be located on any suitable surface 406, 408, 410 of each MIDC 402. Additionally or alternatively, a locking mechanism may be configured to lock the first MIDC 402 in a position, such as a position adjacent to another MIDC 402 or panel 208. For example, the first MIDC 402 may comprise a lever connected to a peg that is configured to be inserted into a locking aperture of the second MIDC 402 or panel 208. In some embodiments, other suitable locking mechanisms such as a cam lock or a spring lock may be used. The locking mechanism may be controlled by a locking mechanism actuator such that actuation of the actuator may cause the locking mechanism to lock the first MIDC 402 in position.

In some embodiments, MIDCs 402s may have circular slots configured to attach to circular recesses. The dimensions of the circular slots may correspond to or equal the dimensions of the circular recesses. In various embodiments, the circular slots are located on the top surface 406 of some MIDCs 402. The circular recesses are located on the bottom surface 410 of some MIDCs 402. Therefore, the circular slots on the top surface 406 of a first MIDC 402 may engage or attach to the circular recesses located on the bottom surface 410 of a second MIDC 402 to couple and secure the first MIDC 402 to the second MIDC 402, such as by applying a attaching force to the first MIDC 402 to transition the circular slots of the first MIDC 402 towards the circular recesses of the second MIDC 402. In this way, the second MIDC 402 may be stacked on top of the first MIDC 402. In some embodiments, the circular slots may instead be located on any side surface 408 of the first MIDC 402. The circular recesses may instead be located on any side surface 408 of the second MIDC 402. The circular slots may engage the circular recesses, as described previously. Therefore, the circular slots can be configured to attach to circular recesses to couple and attach various MIDCs laterally. Furthermore, the attached circular slots and circular recesses may be detachable, such as by applying a detaching force to separate the circular slots from the circular recesses. The recess and slot and configuration could also be reversed such that the circular slots are on the bottom surface 410 of some MIDCs 402 and the circular recesses are on top surface 406 of some MIDCs 402. The circular slots may still engage the circular recesses, as described previously. In some embodiments, there may be four circular slots and circular recesses for each MIDC 402. In embodiments, the circular slots and circular recesses may be any other suitable shape, such as squares. The circular slots and circular recesses may be constructed of rubber, fiberglass, or any other suitable material.

Referring back to FIG. 2, in various embodiments, various receiving panels 208 have embedded features, such as table bases 210, tie-downs 212, and/or drain holes. A table base 210 may be, for example, a post adapter configured to secure a post that may be coupled to a table top to form a table top MIDC, as described below. Alternatively, a plurality of table bases 210 may be grouped together to form a table top MIDC. For example, a plurality of posts may be secured by the plurality of table bases 210 and the plurality of posts may each be coupled to the same table top to form the modular table. In embodiments, the table top may be constructed of light ply wood material that is finished with a laminate. The posts can be, for example, table legs of the modular table. In embodiments, the table top can comprise an edge for securing a cushion MIDC in a position. Tie-downs 212 may be, for example, ropes, strings, cords, straps, or chains for securing or attaching objects. A tie-down 212 may comprise a D-ring. A tie-down 212 may be mounted to a frame of the vehicle 100 to secure or attach objects located in the vehicle 100. In embodiments, an orientation and number of table bases 210 and tie-downs 212 may be selected according to a layout desired by a user of the modular system.

As shown in FIG. 3, the modular floor surface 204 may comprise indentations 302 for wheel wells of the vehicle 100 to enable form fitting within the interior of the vehicle 100. Form fitting may refer to, for example, an indentation 302, such as a recess to receive a wheel of the vehicle 100. Various receiving panels 208 possess recesses that enable embedded features, such as table bases 210, tie-downs 212, and/or drain holes, as depicted in FIG. 2. These recesses may be formed or molded into the modular floor surface, as shown in FIG. 3, by a suitable method during or after construction of the modular floor surface 204. Suitable methods may include, for example, rotational, injection, blow and compression molding as well as thermoforming. An embedded feature may be disposed on a recess and secured, coupled or attached to the corresponding base of the embedded feature to the recess. In some embodiments, the modular floor surface 204 may comprise a raised perimeter to prevent materials such as mud, water, or other liquids from flowing through a seam between the payload surface 202 and the modular floor surface 204.

In various embodiments, the table bases 210 may be circular with a diameter of 7". However, the table bases 210 may be any suitable shape such that the table bases 210 are sized to fit within the recesses of receiving panels 208 to enable secure attachment or coupling of table components to the table base 210. As previously described, table components may include, for example, components such as posts and table tops. In other embodiments, the table base 210 may be attached to other components to form other objects besides tables. For example, the table base 210 may be attached to components to form a mounted flag or telescope. For another example, table base 210 may be a base member of a rack or other shelving type unit. In some embodiments, there may be opposing pairs of tie-downs 212. The tie-downs 212 can be located at symmetrical locations on the modular floor surface 204. In some embodiments, a drain hole can enable drainage of water, such as by water flowing out of the vehicle 100 through the drain hole. The drain hole may be located at any suitable location of the modular floor surface 204 or the vehicle 100. In embodiments, the drain hole 402 is located near an edge 214 of the modular floor surface 204 near the front of the vehicle 100. The front of the vehicle 100 may refer to, for example, a tongue of the vehicle 100. In other embodiments, the drain hole may be located at the center of the modular floor surface 204 or at the back of the vehicle 100. In embodiments, the modular floor surface 204 may be constructed of a material that resists the absorption of liquids. Therefore, the liquid absorption resistant material can be sprayed with water to conveniently clean the modular floor surface 204.

Figure 11:
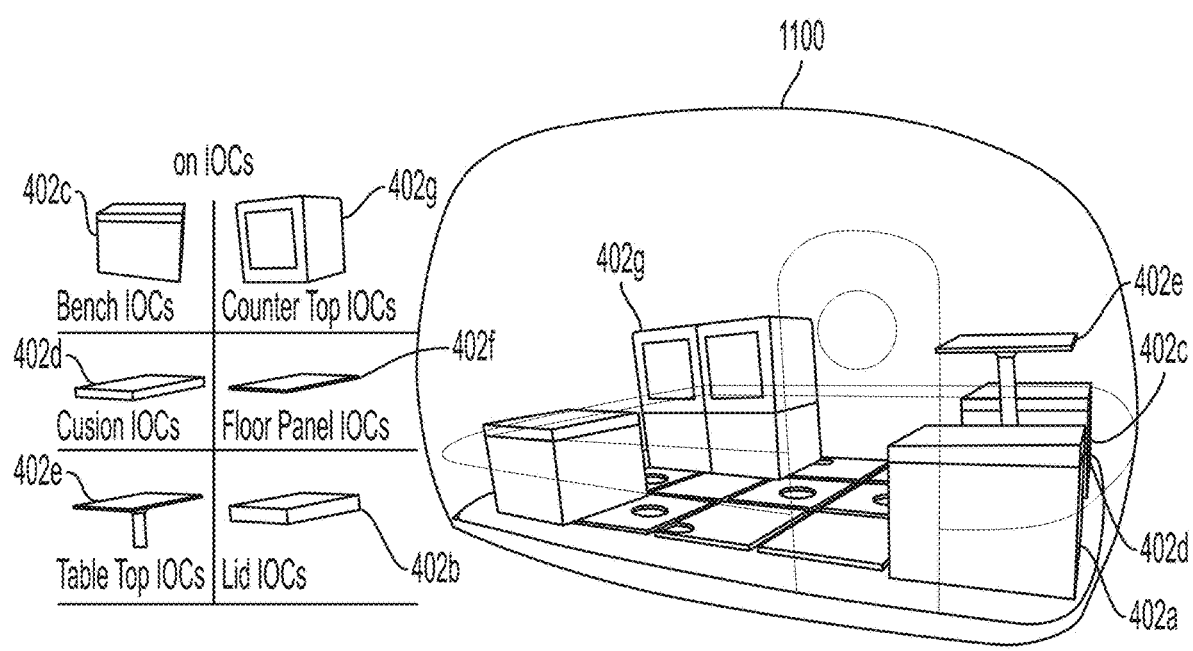
FIGS. 11-28 show various exemplary MIDCs in exemplary layouts according to various embodiments of the present invention.

FIG. 11 displays a layout 1100 comprising various MIDCs of the modular system, including bench MIDCs 402c, cushion MIDCs 402d, a table top MIDCs 402e, a lid MIDCs 402b, a tile MIDC 402f and countertop MIDCs 402g. The layout 1100 also comprises receiving panels 208. In various embodiments, bench MIDCs 402c comprise a basic storage MIDC 402a coupled to the cushion MIDC 402d based on, for example, a bottom surface 410 of the cushion MIDC 402d engaged to the top surface 406 of the basic storage MIDC 402a. The bench MIDCs 402c may be for sitting, sleeping and/or sleeping by a user of the modular system. The engagement between the cushion MIDC 402d and basic storage MIDC 402a refers to the stacking of MIDCs, as described previously. Therefore, the cushion MIDC 402d can be attached to the top surface 406 of any suitable MIDC 402 for stacking. The cushion MIDC 402d may comprise a cushion that provides a soft top surface 406 by, for example, being constructed of a polyester housing comprising a soft material such as wool or feathers. The soft surface of the cushion may be for enhancing the comfort of a user sitting on the cushion MIDC 402. In some embodiments, cushions of the cushion MIDCs 402d comprise a base manufactured by a suitable molding process. Cushions may consist of two layers of polyurethane or other suitable material. The polyurethane may be, for example, a viscoelastic polyurethane foam. Fabrics can be disposed on top of the cushion in accordance with the preferences of a user. In various embodiments, receiving panels 208 are constructed of woven material, such as Infinity Luxury Woven Vinyl, available from Infinity Woven Products of Dalton, Ga.

As previously described, the table top MIDC 402e can be a modular table comprising a table top coupled to a post secured by a table base 210. The table base 210 can be mounted or set in the modular floor surface 204. The post may be secured to the table base 210 by, for example, an interlocking mechanism between the table base and the post such that the post is engaged to the table base 210 in the modular floor surface 204. The table top may be coupled to the post by, for example, threaded fasteners or other suitable fasteners, such as the MIDC fastener components described previously. The table top can be a surface for a user to place desired items thereon. In addition, in embodiments, the post may be extendable and retractable to predefined heights. For example, the height of the post can be adjusted to position the table top MIDC 402e at the same height as other MIDCs 402 in a modular layout. Therefore, in some embodiments, a user can place desired items that span the length of both the table top MIDC 402e and an adjacent MIDC 402 of the same height. In other words, the table top MIDC 402e and the adjacent MIDC 402 can form an extended table top surface.

Figure 26:
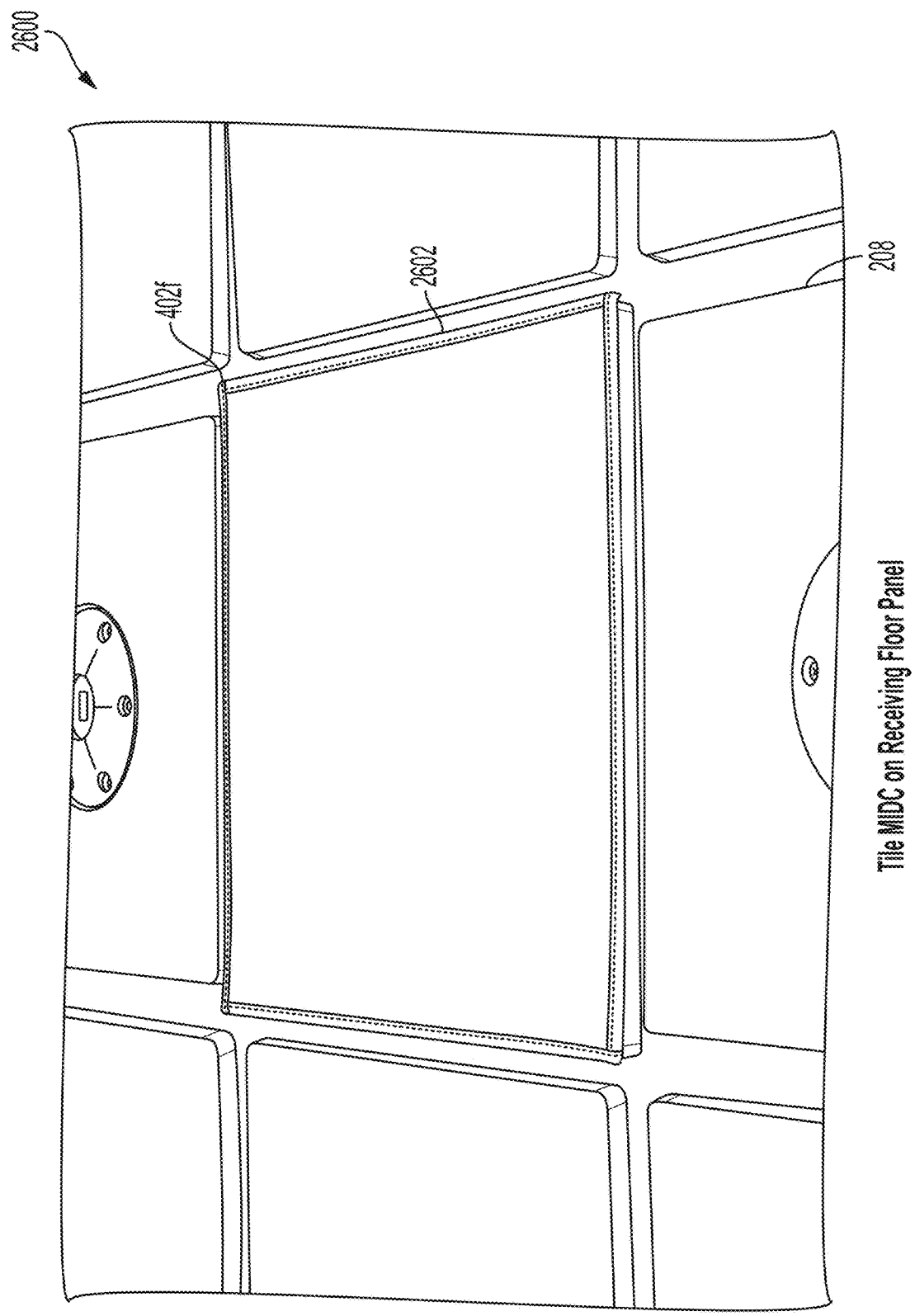

Similar to the cushion MIDC 402d, the lid MIDC 402b can be attached to a suitable MIDC 402 by engaging the top surface 406 of a suitable MIDC 402. The lid MIDC 402b can cover the aperture of the top surface 406 of a basic storage MIDC 402a, as described in FIG. 5. In embodiments, the lid MIDC 402b can also cover apertures of other MIDCs 402. The tile MIDC 402f may cover the entire top surface 406 of a panel 208 or a MIDC 402, as shown in FIG. 26. The tile MIDC 402f can include a cover comprising material such as carpet, wood, metal, linoleum and/or other suitable tile material according to the preferences of users of the modular system. The countertop MIDC 402g may comprise a door and a top surface 406 comprising a counter top constructed of a suitable material such as Formica. The door may be for covering an aperture that can define a storage compartment of the counter top MIDC 402g. In embodiments, any of the types or modular variants of MIDCs 402 described herein may be stacked, as previously described. FIG. 11 shows the layout 1100 of MIDCs 402 in the interior of a vehicle 100. In the layout 1100, a table top MIDC 402e is placed between two bench MIDCs 402c. Two countertop MIDCs 402g are each placed on top of a basic storage MIDC 402a. The two basic storage MIDCs 402a can have a lid MIDC 402b (not shown) disposed on the top surface 406. In embodiments, a tile MIDC 402f (not shown) may be placed on the top surface 406 of any of the pictured MIDCs 402. However, no MIDCs 402 are placed on the top surface of the tile MIDC 402f.

Figure 12:
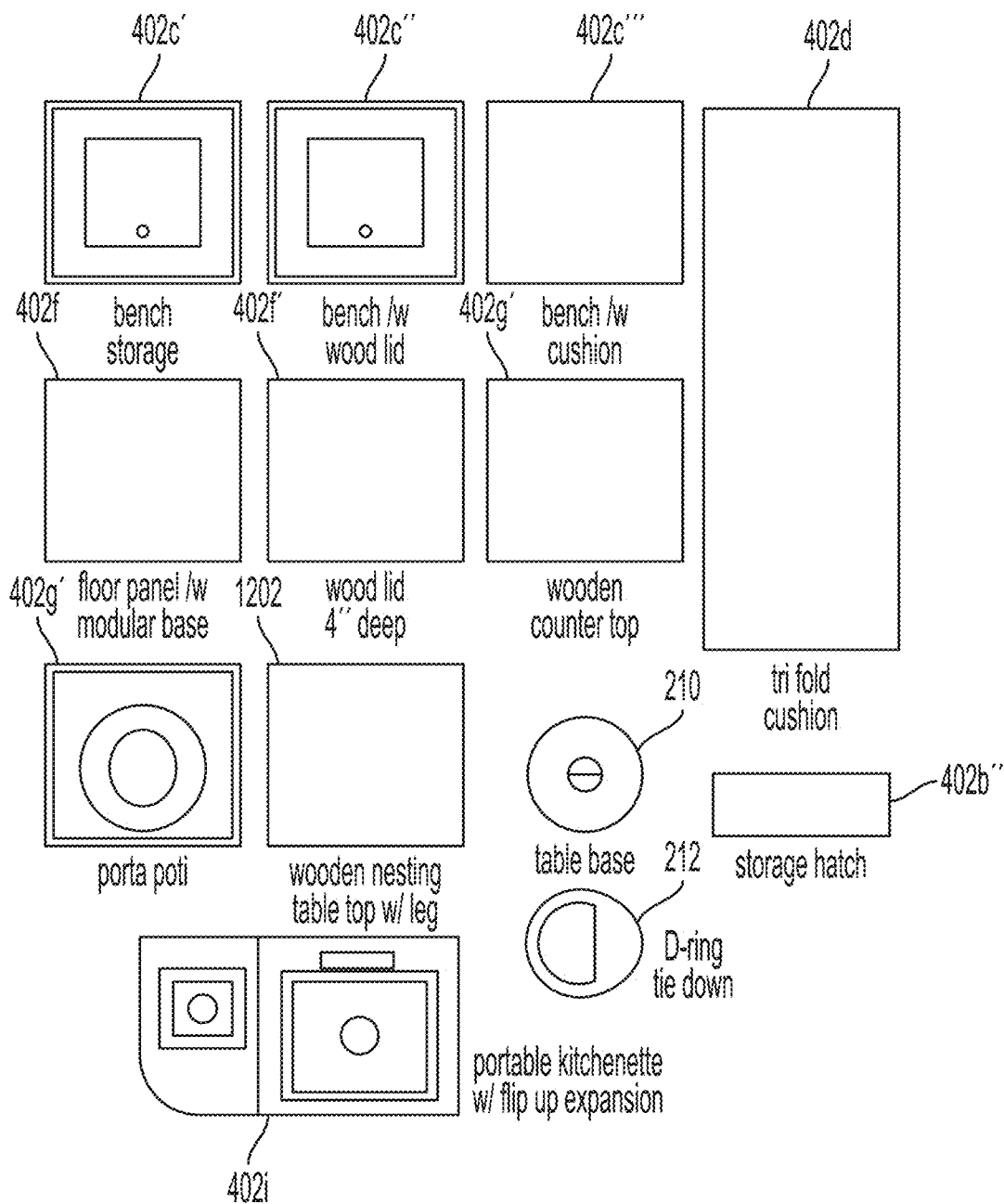

FIG. 12 provides top views 1200 of various types of MIDCs 402 and other components of the modular system. The variants of MIDCs 402 and components of the modular system comprise a bench storage MIDC 402c', wooden lid bench MIDC 402c'', cushion bench MIDC 402c''', tile MIDC 402f, wooden lid MIDC 402b', wooden counter top MIDC 402g', tri-fold cushion MIDC 402d, commode MIDC 402h, table top 1202, table base 210, storage hatch lid MIDC 402b'', and kitchenette MIDC 402l. In various embodiments, the bench storage MIDC 402c' comprises a bench MIDC 402c further comprising a storage compartment, such as the storage compartment described previously. The wooden lid bench MIDC 402c'' may comprise a bench MIDC 402c further comprising a lid MIDC 402b, constructed of a suitable wood material. The cushion bench MIDC 402c''' may comprise a bench MIDC 402c further comprising a cushion 402d. The tile MIDC 402f may be disposed on any suitable MIDC 402. The wooden lid MIDC 402b' can be constructed of a suitable wood material. The wooden counter top MIDC 402g' comprises a counter top MIDC 402g with a counter top constructed of a suitable wood material. The tri-fold cushion MIDC 402d' comprises a tri-fold cushion that provides a soft top surface 406 disposed flatly across multiple suitable MIDCs 402, such as three adjacent bench MIDCs 402c of the same height. In other words, the length of the tri-fold cushion equals the length of three standard MIDCs 402, such as basic storage MIDCs 402a. MIDCs 402 may be of a standard size but others MIDCs 402 such as the tri-fold cushion MIDC 402d' may be oversized such that they have dimensions exceeding the dimensions of standard size MIDCs 402. In contrast, a standard size MIDC 402 may be stacked over another standard size MIDC 402 such that stacking of standard size MIDCs 402 may be in a one to one ratio.

Moreover, oversized MIDCs 402n are also a suitable modular type of MIDC 402. Oversized MIDCs 402n may possess greater height dimensions such that they are taller MIDCs than standard size MIDCs 402. Additionally or alternatively, oversized MIDCs 402n may possess greater width or length dimensions such that they extend horizontally. The commode MIDC 402h can comprise a portable toilet such as a Porta Potti® by Thetford Corp. of Ann Arbor, Mich. The wooden table top 1202 is constructed of a suitable wood material. As described previously, the table top 1202 can be a component of the table top MIDC 402e. The storage hatch lid MIDC 402b'' adjustably covers the storage compartment of a storage MIDC 402a. The kitchenette MIDC 402l may comprise a sink MIDC 402i and a stove MIDC 402j. In embodiments, the kitchenette MIDC 402l can comprise a five gallon water tank. The kitchenette MIDC 402l can also comprise a sink MIDC 402i, a stove MIDC 402j, a refrigerator and a silverware drawer. The sink MIDC 402i can be a flip up expansion component, such as the expandable panels described in FIGS. 13-14, of the kitchenette MIDC 402l. As described herein, a suitable wood material may be, for example, Lite-Ply®, redwood, mahogany, pine, ash or any suitable type of wood.

Figure 13:
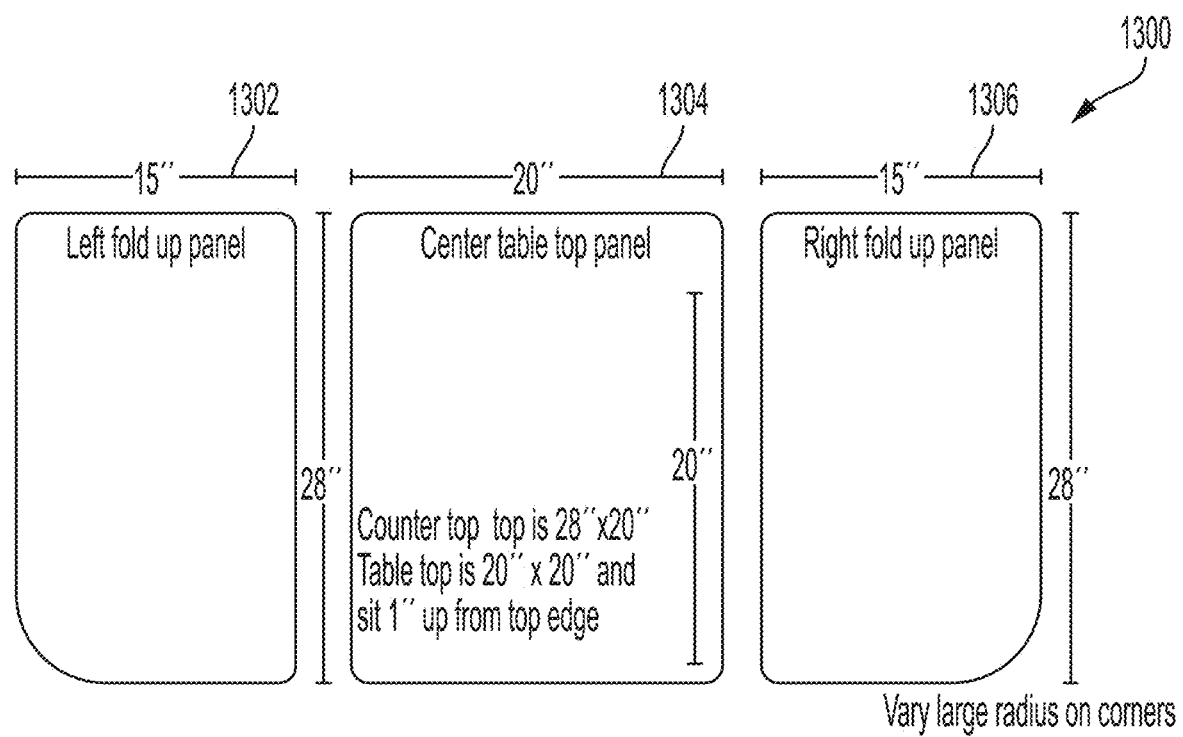
Figure 14:
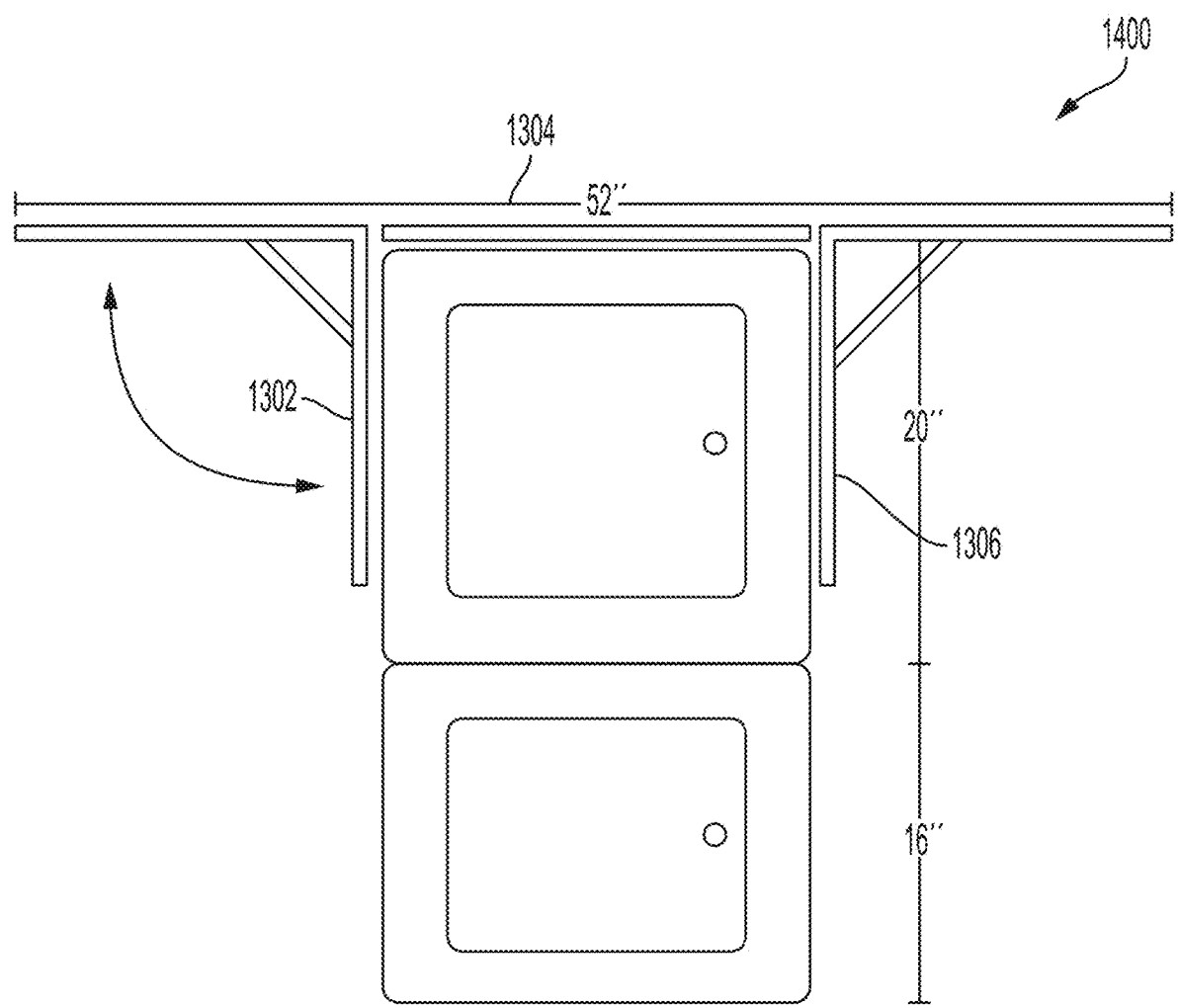

FIG. 13 provides a top view 1300 and FIG. 14 provides a side view 1400 of expandable surface panels of MIDCs 402. The view 1300 comprises a plurality of expandable panels 1302, 1304, 1306. The center panel 1304 may be a panel disposed on or comprising a top surface 406 of a MIDC 402. In some embodiments, the left panel 1302 and right panel 1306 can be disposed on or comprise side surfaces 408 of the MIDC 402. The expandable panels 1302, 1306 can initially be in a folded configuration parallel to the side surfaces 408. The folded configuration may, for example, correspond to a retracted position, where the expandable panels 1302, 1306 rest along or hang adjacent and about parallel to a side surface of a MIDC. As shown in the full view 1400, the left and right panels 1302, 1306 may each be configured to unfold distally from the side surfaces 408 such that the panels 1302, 1306 are perpendicular to the side surfaces 408 and form one extended surface with the center panel 1304. Alternatively, only one of the left and right panels 1302, 1306 is unfolded distally. Therefore, the extended surface may possess a greater length than the length of the top surface 406 and extend beyond an edge of the top surface 406. In embodiments, the length of the extended surface may comprise fifty inches. In other embodiments, a user may place items or materials on any one of the panels 1302, 1304, 1306 or the continuous surface such that the panels 1302, 1304, 1306, or any combination or subcombination thereof is usable as a table. As shown in the view 1400, doors may each be embedded in a side surface 408. In some embodiments, the doors can comprise a knob or handle that a user may use to control the doors transitioning between closed and open configurations.

In various embodiments, another modular type of the MIDCs 402 includes a power box MIDC 402 for providing electrical power to, for example, an appliances or a mobile device of a user of the modular system. In some embodiments, the power box MIDCs 402 can comprise solar panels for converting solar power into electrical power. The solar panels may form a solar power pack. The solar power pack can be located within the interior of a power box MIDC 402, such as within a storage compartment. The power box MIDCs 402 can comprise a suitable solar based power source such as the Goal Zero Yeti 400 Portable Power Station, available from Goal Zero Corporation of Bluffdale, Utah. Besides solar power sources, any other suitable power source may be used to power the power box MIDC 402. In embodiments, the power box MIDCs 402 may comprise doors constructed of wood material.

Figure 15:
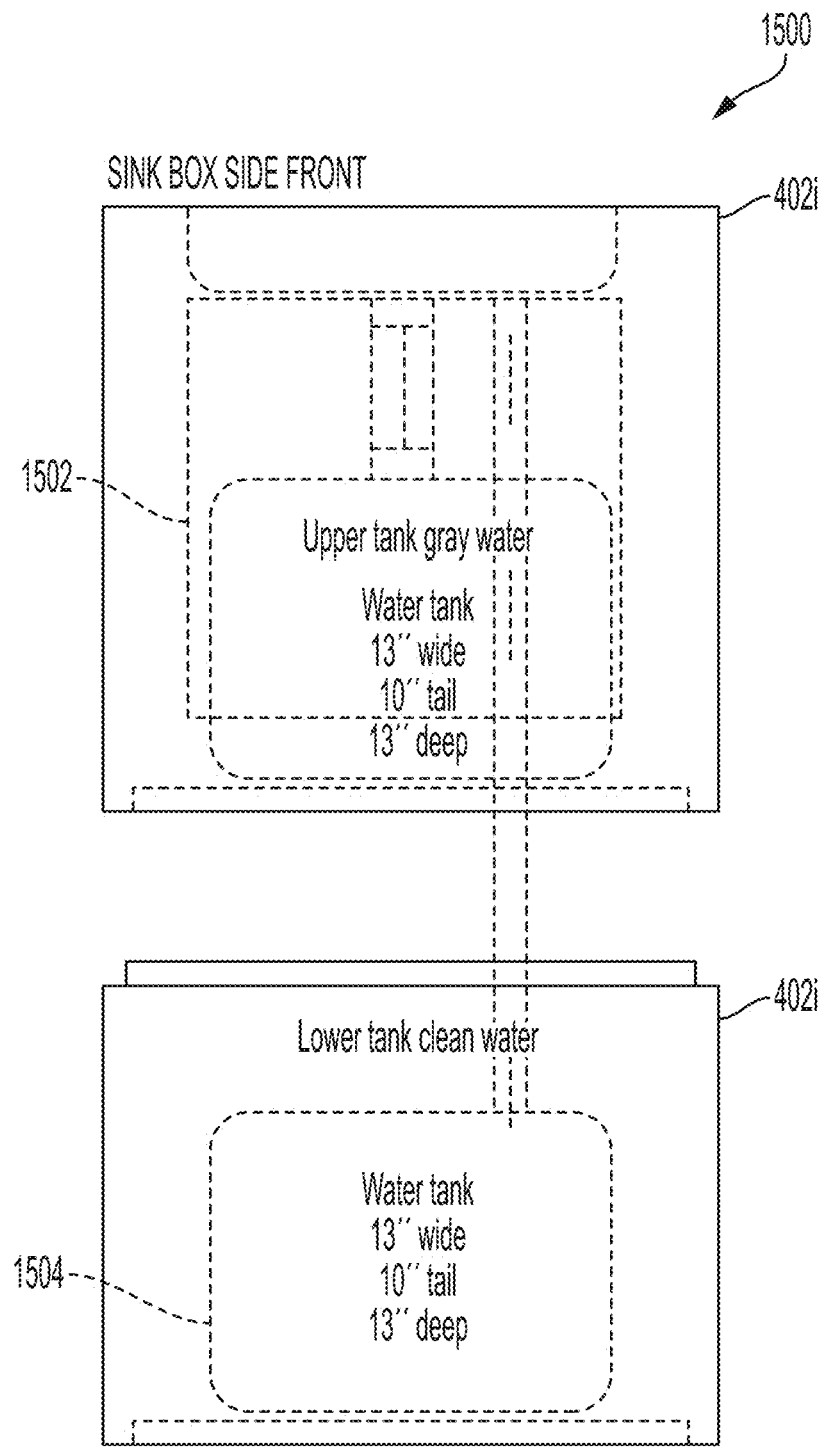
Figure 16:
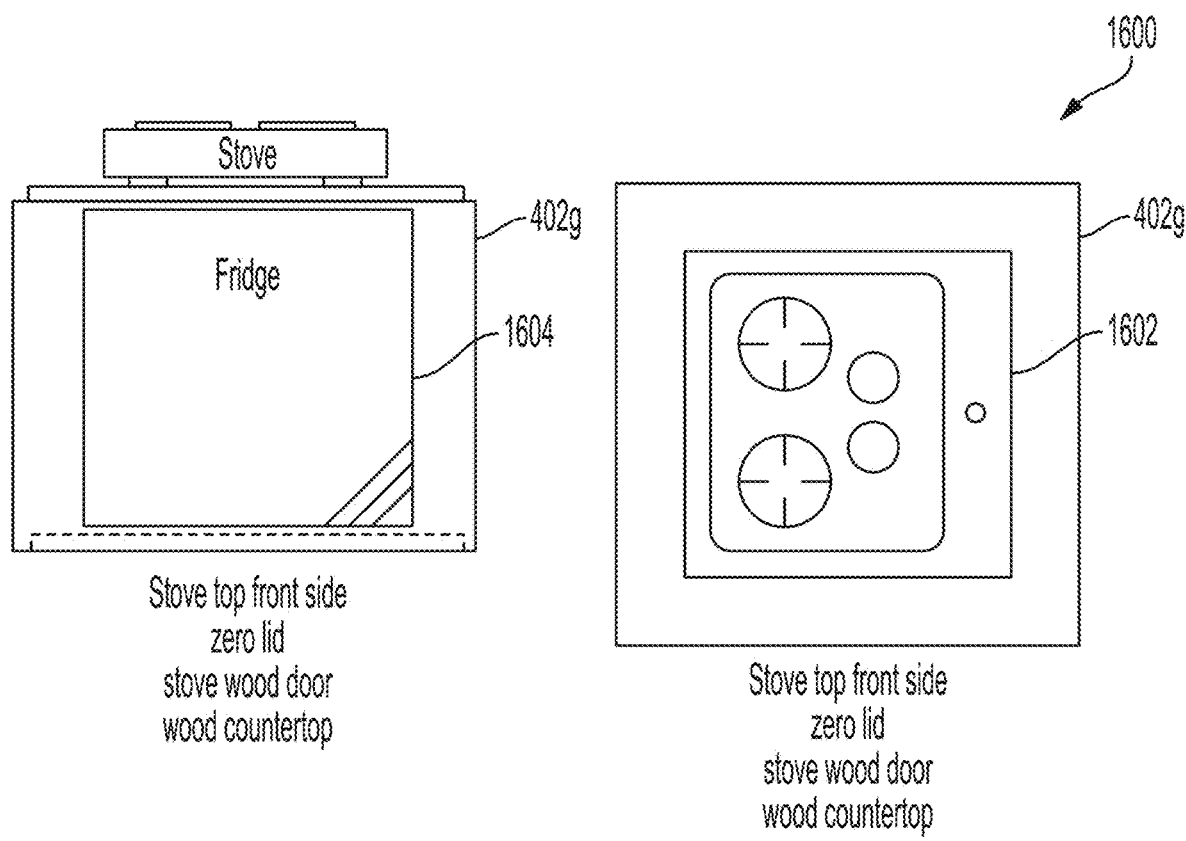
Figure 25:
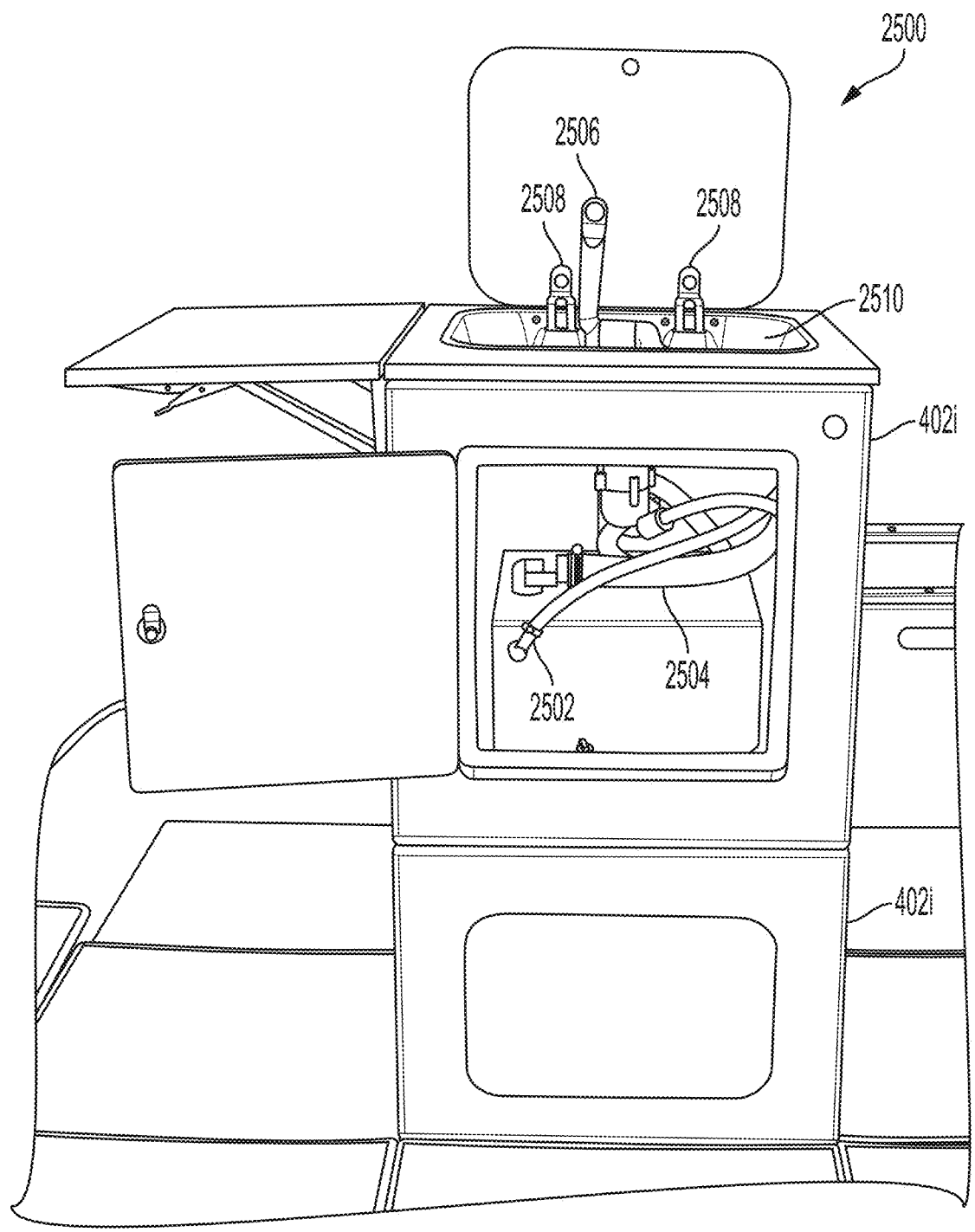

FIGS. 15-16 are depictions 1500, 1600 of sink MIDCs 402i and a stove MIDC 402j, respectively. Set 1500 comprises two sink MIDCs 402i working in conjunction for implementing a plumbing operation. A first sink MIDC 402i comprises an upper tank 1502 and a second sink MIDC 402i comprises a lower tank 1504. The upper tank 1502 can be configured to store unclean or used water. The lower tank 1504 can be configured to store clean or unused water. The first and second sink MIDCs 402i can be stacked on top of each other. In some embodiments, the dimensions of the tanks 1502, 1504 may be 13" in width, 10" in height, and 13" in length. As shown in FIG. 25, the sink MIDCs 402i may comprise pumps, sinks, faucets, plumbing components, or any combination or sub-combination thereof. In embodiments, the plumbing components comprise pipes to deliver and drain water. In particular, the pipes can be configured to deliver water from the upper tank 1502 to the faucet and to drain water flowing from the faucet to a drain to the lower tank 1504. A sink may be embedded into the top surface 406. The sink can comprise a faucet to receive the delivery of water and to control the flow of water. The sink MIDCs 402i may further comprise the foldable panels 1302, 1304, 1306, as described with reference to FIG. 13.

In various embodiments, as shown in view 1600, stove MIDCs 402j may comprise electrical wiring, a power source, and other components for heating a cooktop component to cook food. The electrical wiring may comprise direct current (DC) plugs for connecting to a power source, such as an electrical power source, and a refrigerator 1604, such as the RCA 1.6-1.7 Cubic Foot Fridge, available from Igloo Corp. of Katy, Tex. The cooktop component may be a suitable cooktop 1602, such as the Duxtop 8100MC Induction Cooktop, available from Secura Inc. of Brookfield, Wis. In embodiments, the electrical power source is replaced by power provided by power box MIDCs 402. The stove MIDCs 402j may comprise a wooden lid MIDC 402b' for housing a butaine stove top. The sink MIDC 402i and the stove MIDC 402j may comprise additional components based on the use or function of the respective sink MIDC 402i or stove MIDC 402j. In some embodiments, the kitchenette MIDC 402l comprises a suitable number of sink MIDCs 402i and stove MIDCs 402j for implementing the plumbing and cooking functions as described herein.

Figure 17A:
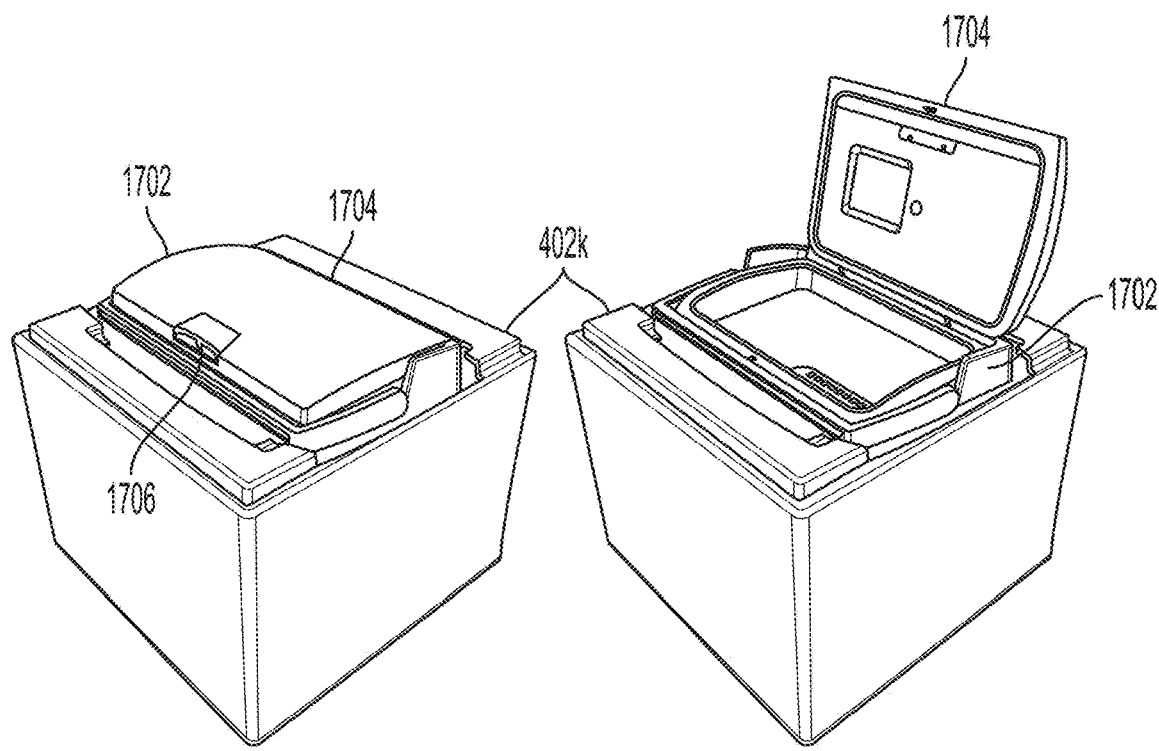
Figure 17B:
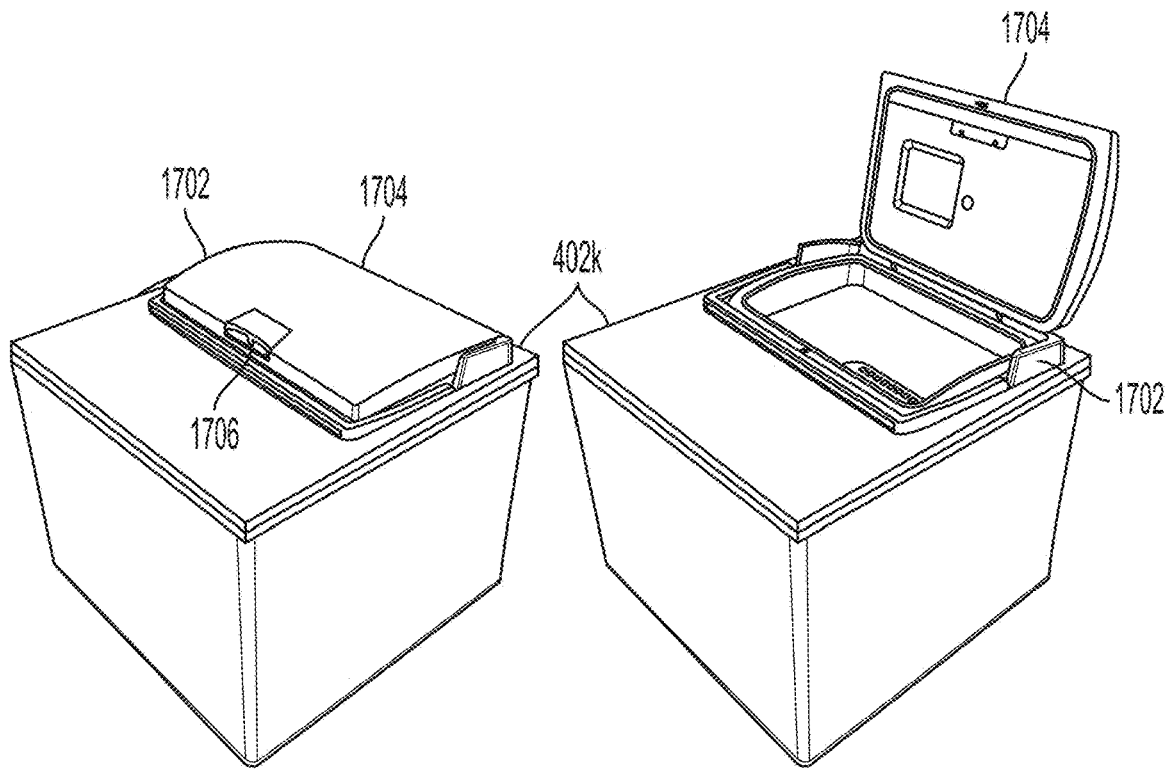

FIGS. 17a and 17b show exemplary open and close configurations of a cooler MIDC 402k. In various embodiments, the cooler MIDC 402k comprises a cooler 1702, as described in further detail with reference to FIG. 18. The cooler 1702 may comprise, for example, ice or some other suitable cooling element stored within an insulated housing. The insulated housing may be a suitable thickness, such as three inches thick. The cooler 1702 can also comprise a cooler lid 1704, which may comprise a hinge and latch 1706. A user of the modular system may actuate the latch 1706 to transition the cooler lid 1704 from a closed configuration to an open configuration. The user may also apply a closing force to the cooler 1702 until the cooler lid 1704 contacts the catch of the latch 1706 to transition and secure the cooler lid 1704 from the open to the closed configuration. In embodiments, as shown in FIG. 17a, the cooler 1702 may be embedded in or disposed on the top surface 406 of the cooler MIDC 402k. In other embodiments, as shown in FIG. 17b, the cooler 1702 may be embedded in or disposed on the top surface 406 of a lid MIDC 402b that is stacked on the cooler MIDC 402k. In such embodiments, the cooler 1702 may be part of the lid MIDC 402b. FIG. 17b shows the lid MIDC 402b as constructed of a wood material, but any other suitable construction material may be used. Alternatively, the cooler MIDC 402k can be combined or stacked with any other suitable MIDC 402. Thus, the cooler 1702 could be embedded in or disposed in the top surface 406 of the other suitable MIDC 402. FIGS. 17a and 17b show the cooler lid 1704 in a closed and an open configuration. From the open configuration 2204, the interior of the MIDC 402 may be visible.

Figure 18:
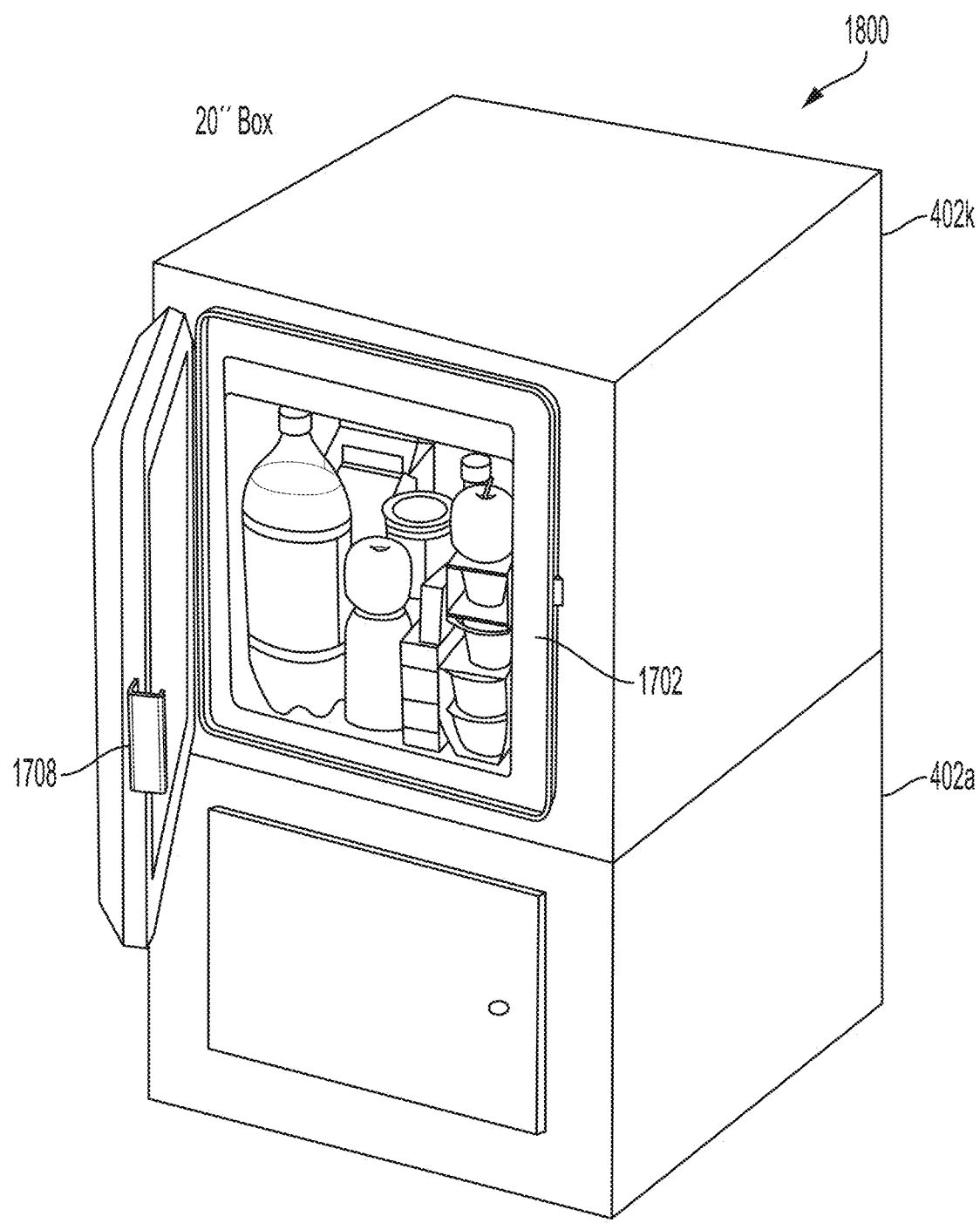
Figure 19:
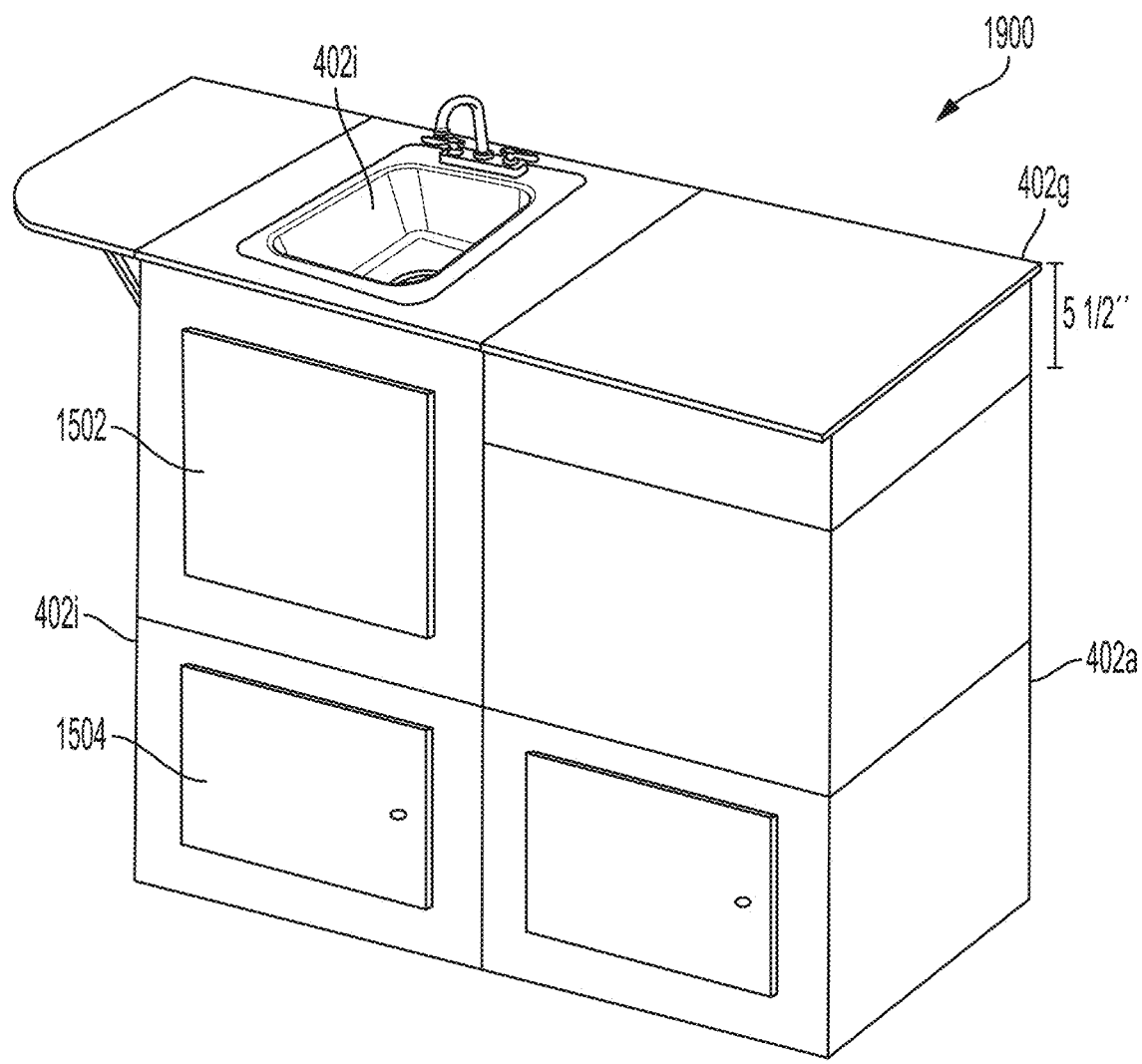

FIG. 18 shows a modular layout 1800 comprising a cooler MIDC 402k stacked on top of a basic storage MIDC 402a. As previously described, the modular layout 1800 may be a layout arranged on a modular floor surface 204 within a vehicle 100. The cooler MIDC 402k may be stacked on the basic storage MIDC 402a so that the cooler MIDC 402k is at a desirable height for a user of the modular system. As shown in FIG. 18, in embodiments, the cooler 1702 is embedded into the cooler MIDC 402k such that the interior of the cooler is contained within the interior of the cooler MIDC 402k. The cooler MIDC 402k may comprise a door to the cooler 1702. The door can be adjustable between the open and closed configurations to open and close the embedded cooler 1702. The door may comprise a latch 1708 to secure the door in the closed configuration. When in the open configuration, items such as bottles of liquid or containers of food may be placed in the interior of the embedded cooler 1702. When in the closed configuration, the temperature of items placed within the embedded cooler 2302 may be reduced or may rise at a reduced rate relative to the exterior of the embedded cooler 2302. The door may be transparent such that a user may view the items stored within the cooler. FIG. 19 shows a modular layout 1900 comprising two sink MIDCs 402i, a countertop MIDC 402g and a basic storage MIDCs 402a. The first sink MIDC 402i is stacked on top of the second sink MIDC 402i and the countertop MIDC 402g is stacked on the basic storage MIDC 402a. In some embodiments, the sink MIDCs 402i each comprise at least one expandable surface panel, such that the expandable panels resting along the left side surfaces 408 of the sink MIDCs 402i are unfolded, as described with reference to FIGS. 13-14. In embodiments, the first sink MIDC 402i comprises the upper tank 1502 (shown in shadow) and a second sink MIDC 402i comprises the lower tank 1504 (shown in shadow). In some embodiments, the countertop MIDCs 402h may further comprise an extended surface or panel, as described with reference to FIGS. 13-14.

Figure 20:
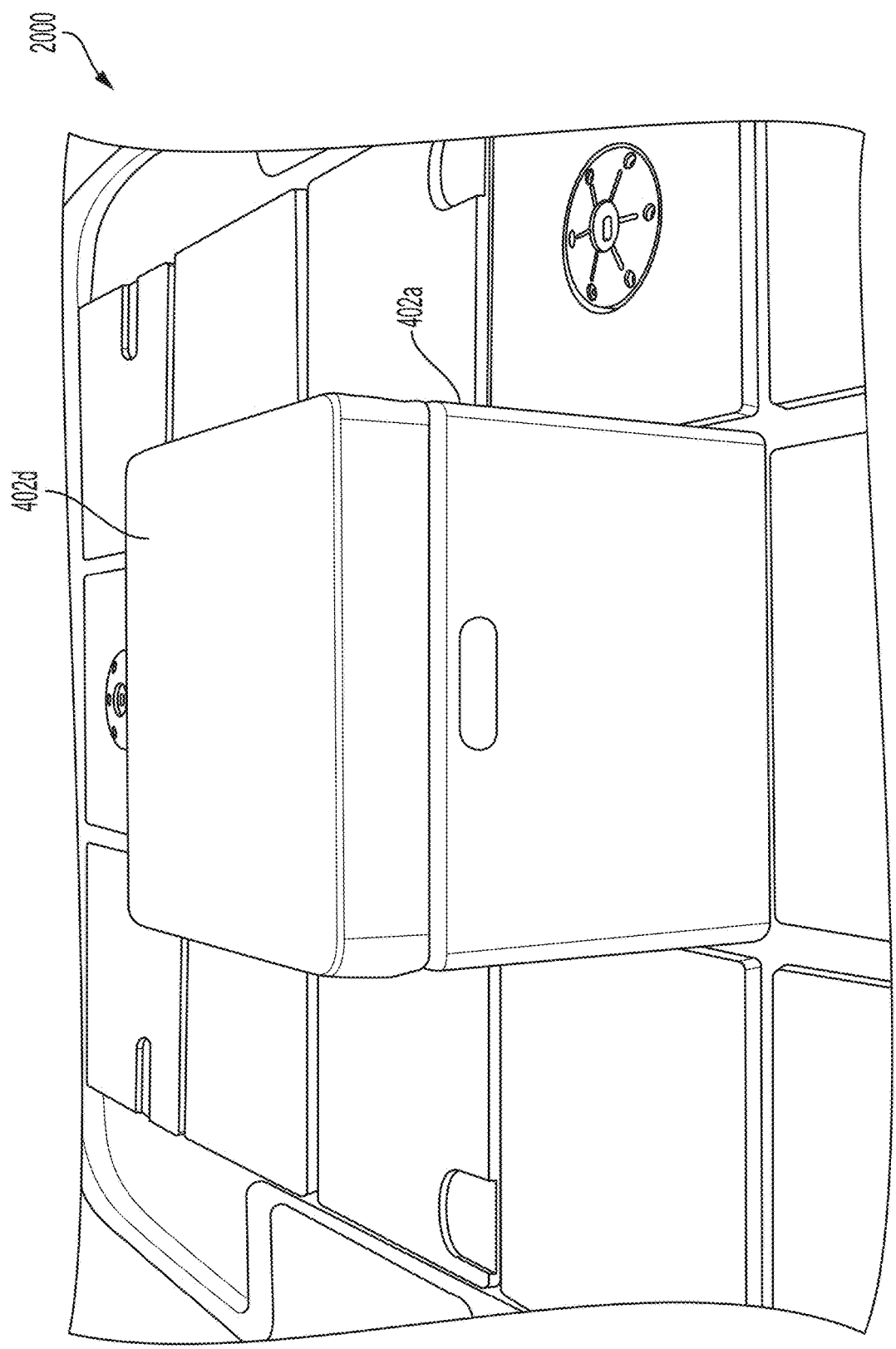

FIG. 20 shows view 2000 comprising a cushion MIDC 402d disposed or stacked on a top surface 406 of a basic storage MIDC 402a. As previously disclosed in connection with FIG. 11, the cushion MIDC 402d can be coupled to the top surface 406 of any suitable MIDC 402, such as the basic storage MIDC 402a. The bottom surface 410 of the cushion MIDC 402d can be similar to the bottom surface 410 of any suitable MIDC 402. For example, a recessed interior surface 604 of the cushion bottom surface 410 can engage the raised interior surface 404 of the MIDC bottom surface 410. In some embodiments, any one side of the cushion MIDC 402d can be thicker than any other side. A side that is of relatively thicker dimensions may be more comfortable for the user positioned on the relatively thicker side. For example, the legs of the user may be positioned over the relatively thicker side. Furthermore, in embodiments, the cushion MIDC 402d includes a recessed edge along the length of a side surface 408 of the cushion MIDC 402d. When the cushion MIDC 402d is placed on top of the basic storage MIDC 402a, another component or material such as a wooden surface may be inserted into a recessed portion of the recessed edge to form a portion of a bench MIDC 402c.

Figure 21:
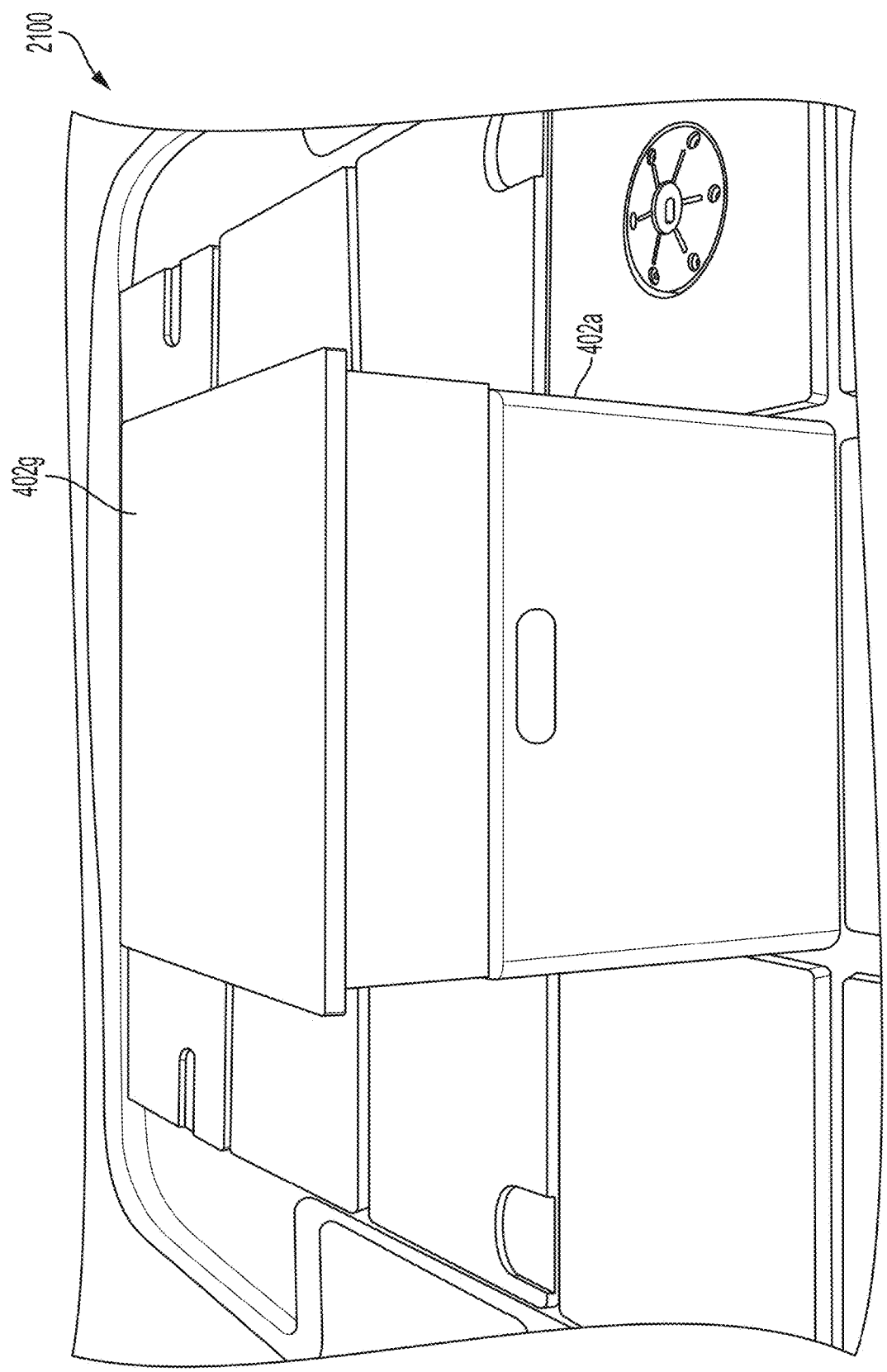

FIG. 21 shows view 2100 comprising shows a countertop MIDC 402g disposed on a top surface 406 of a basic storage MIDC 402a. The bottom surface 410 of the countertop MIDC 402g can be similar to the bottom surface 410 of a basic storage MIDC 402a. In some embodiments, the countertop MIDC 402g may possess a predetermined height and a predetermined length such that the countertop MIDC 402g may extend a desired height and/or length above and/or beyond the top surface 406 of the basic storage MIDC 402a. Therefore, the top surface 406 of the countertop MIDC 402g may possess a greater width and length than the length and width of the basic storage MIDC 402a. In other embodiments, the width and length of the top surface 406 of the countertop MIDC 402g may be equal. As previously disclosed, the countertop MIDC 402g can be constructed of any suitable material such as Formica. Other suitable materials such as wood, plastic, glass, or metal may be selected according to user preferences and/or durability.

Figure 22:
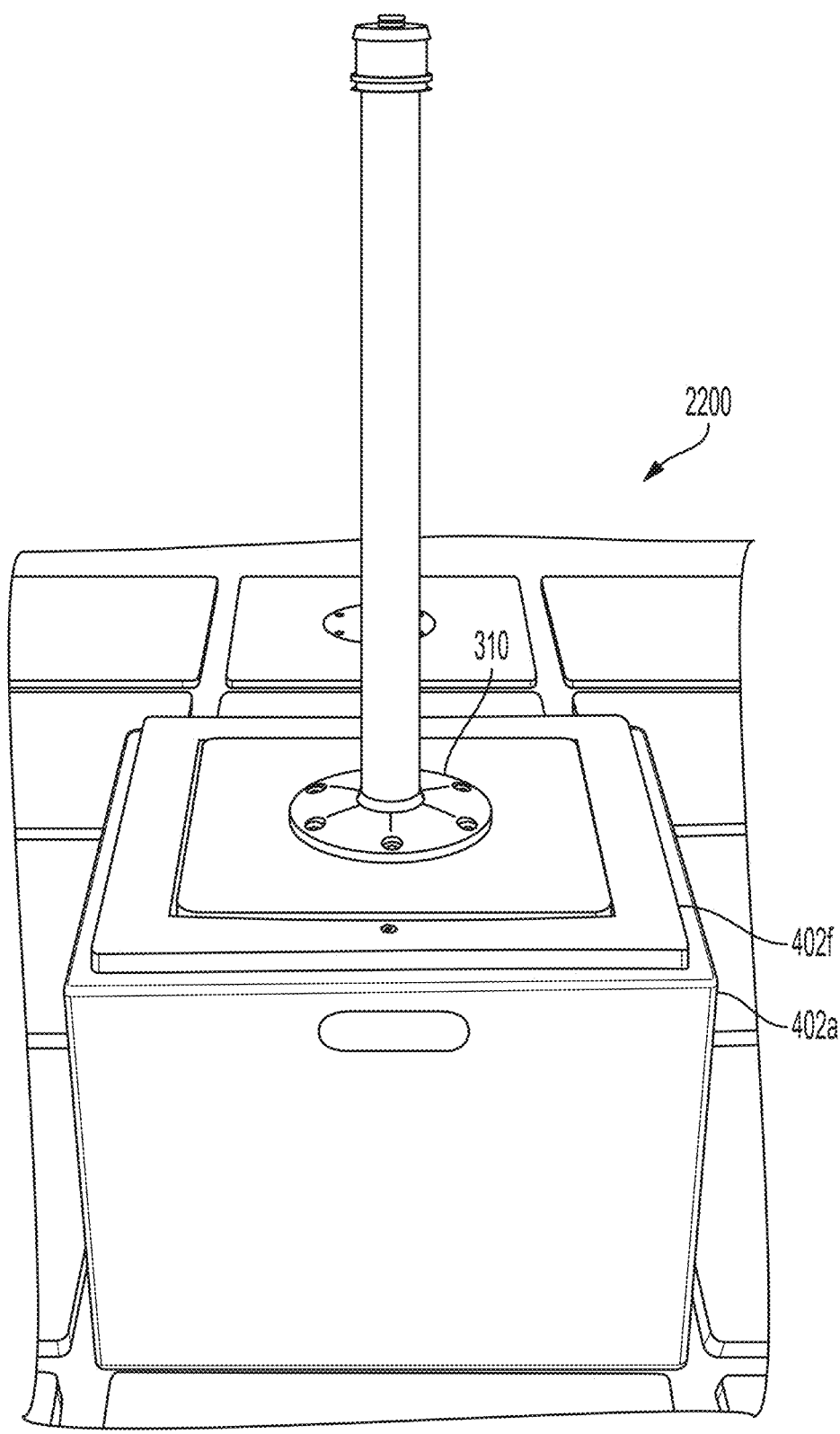

FIG. 22 shows a view 2200 comprising a table base 210 disposed on a basic storage MIDC 402a through a tile MIDC 402f. As previously described, the tile MIDC 402f may cover the entire top surface 406 of a MIDC 402, including the aperture of the top surface 406 as shown, for example, in FIG. 4. In embodiments, the tile MIDC 402f may instead be replaced by a lid MIDC 402b. In various embodiments, the table base 210 is a circular base for receiving a post. The post may be attachable to and detachable from the table base. A prong may insert into an aperture in the table base 210. In other embodiments, a threaded connection between the post and table base, or other appropriate attachment mechanism secures the attachment of the post to the table base 210. The post may also comprise an adjustment mechanism enables the user of the modular system to raise or lower the height of a table top attached to the post. In various embodiments, the table base 210 comprises a plurality of holes for inserting threaded fasteners or other suitable fasteners. Inserting the threaded fasteners or other suitable fasteners secures the table base 210 to the basic storage MIDC 402a through the tile MIDC 402f. In other embodiments, the fasteners may be inserted to secure the table base 210 through both basic storage MIDC 402a and the tile MIDC 402f to the modular floor surface 204, and/or the payload surface 202. In embodiments, the post may comprise an interlocking feature that corresponds with a receiving component in the table base 210 such that the post may be secured by inserting the interlocking feature into the receiving component and rotating the interlocking feature.

Figure 23:
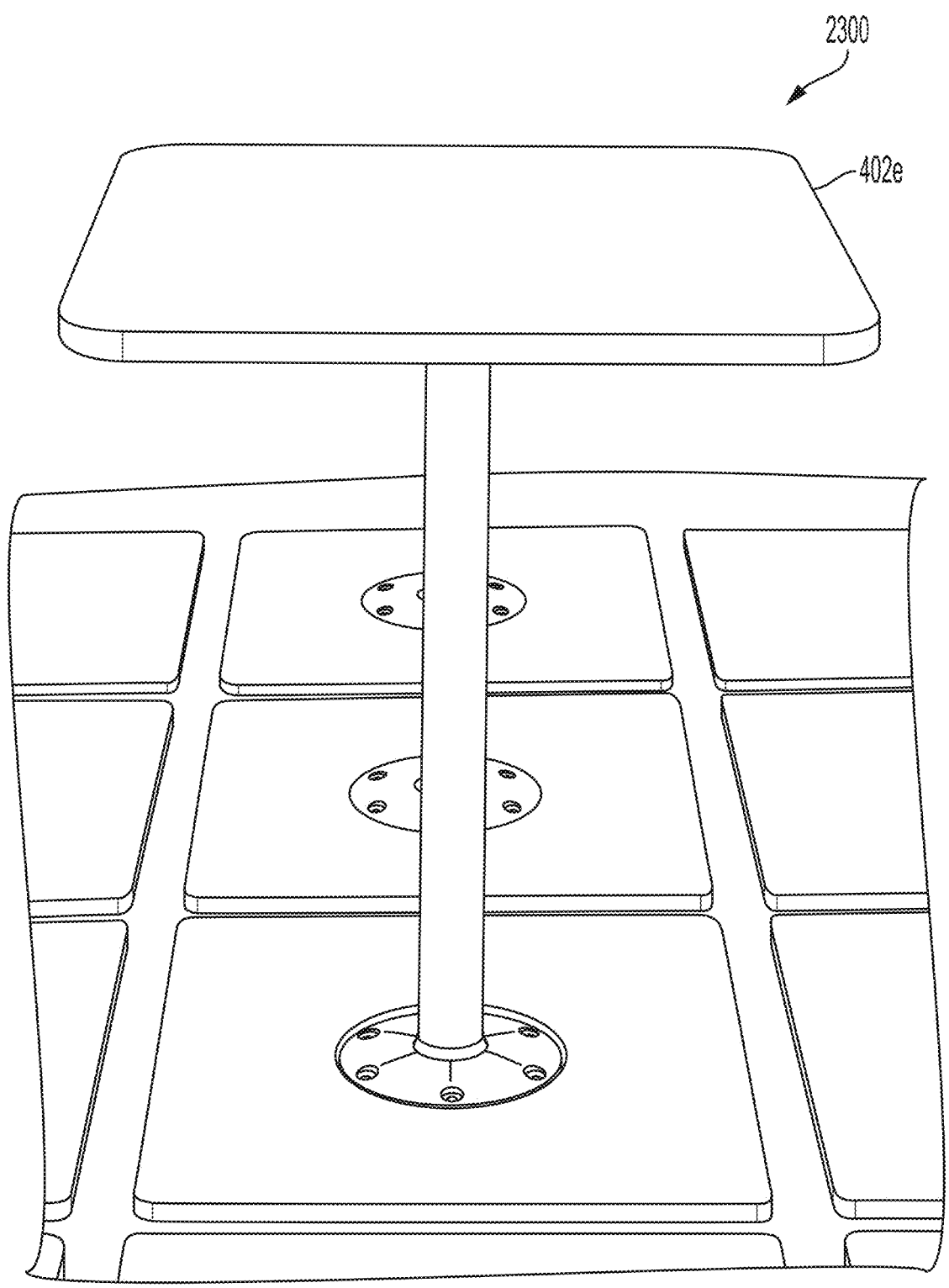

As previously disclosed, a post that may be coupled to a table top to form a table top MIDC 402e. In contrast, FIG. 23 shows a view 2300 of table top MIDC 402e disposed on a receiving panel 208. As shown in FIG. 23, the table base 210 is embedded into the receiving panel 208. Attaching a post coupled to a table top and securing the post to the table base 210 forms a table top MIDC 402e.

Figure 24:
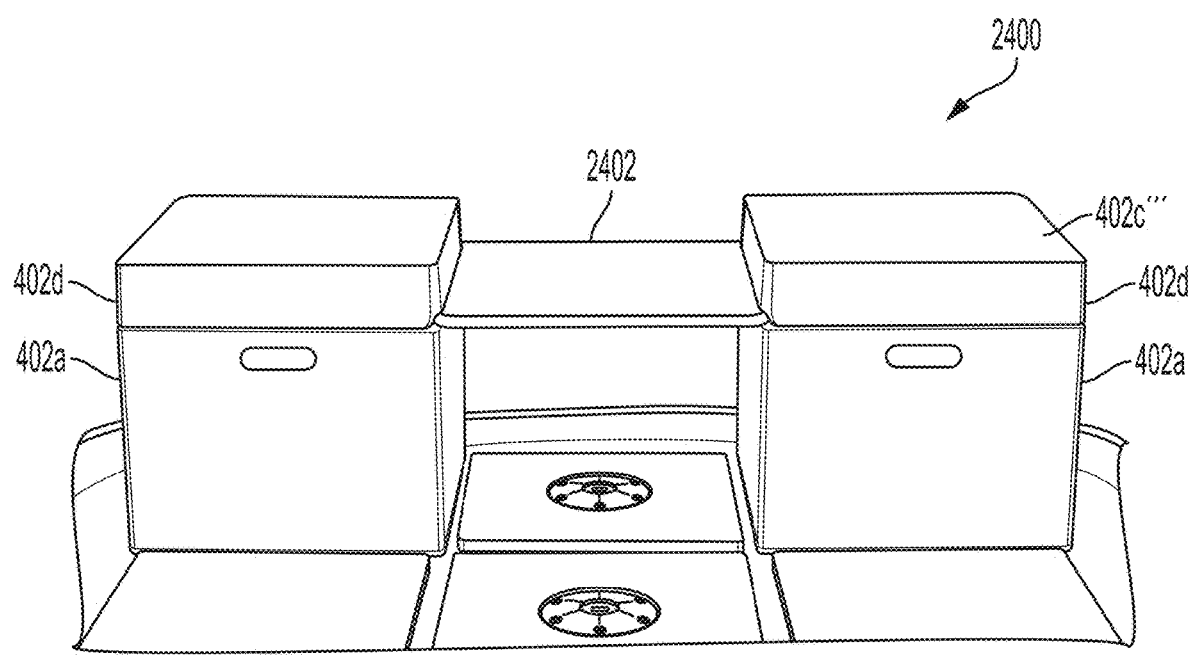

FIG. 24 shows a view 2400 of an extended bench MIDC 402c''''. In various embodiments, the extended bench MIDC 402c'''' may comprise a first basic storage MIDC 402a on a first receiving panel 208, a second basic storage MIDC 402a on a second receiving panel 208, and a wooden surface 2402. A third receiving panel 208 may be located between the first and second receiving panels 208. A cushion MIDC 402d may be stacked on each of the first and second basic storage MIDCs 402a, as described previously. The wooden surface 2402 may be inserted into a recessed edge along a side of each of the cushion MIDCs 402d such that the first and second basic storage MIDCs 402a restrain the wooden surface 2402 in position. Thus, the wooden surface 2402 is disposed above the third receiving panel 208. In embodiments, the wooden surface 2402 is any suitable bench surface. Any suitable adhesive or fastener may be used to secure the position of the wooden surface 2402. In some embodiments, a user of the modular system may sit on the wooden surface 2402.

FIG. 25 shows a view 2500 of a sink MIDC 402i stacked on top of a basic storage MIDC 402a placed on a receiving panel 208. As previously described, the sink MIDC 402b may comprise water storage components 2502, plumbing components 2504, a faucet 2506, handles 2508, drain components, and other components to make a self contained sink 2510. The sink MIDC 402i may be stacked on top of one or more suitable MIDCs 402 such that the sink MIDC 402i is at a desired height of the user of the modular system. In some embodiments, the sink MIDC 402i may include a door on a front side surface 408 to access the water storage 2502, plumbing 2504, and drain components of the sink MIDC 402i. The sink MIDC 402i may further comprise an expandable panel for unfolding distally with respect to a first side surface 408 of the sink MIDCs 402i, such that the expandable panel resting along the corresponding side surface 408 of the sink MIDC 402i is unfolded, as previously described. Therefore, in embodiments, an extended counter section may be formed. The extended counter section comprises the top surface 406 of the sink MIDC 402i and the unfolded counter section. In other embodiments, the sink MIDC 402i may comprise a second foldable counter section for unfolding distally with respect to a second side surface 408 of the sink MIDCs 402i. The first and second side surfaces 408 may be opposing side surfaces 408.

FIG. 26 depicts a view 2600 of a tile MIDC 402f. The tile MIDC 402f may be placed on a receiving panel 208 for aesthetic purposes, such as, for example, as a decorative tile cover 2602 for a receiving panel 208 that is not occupied with a MIDC 402. In other words, the tile MIDC 402f may be a floor decoration for an unoccupied panel 208. In some embodiments, the tile MIDC 402f prevents an MIDC 402 from being stacked on top of an unoccupied panel 208 with a tile MIDC 402f placed thereon. As previously described, the tile MIDC 402f may cover the entire top surface 406 of a MIDC 402, including the aperture of the top surface 406 as shown, for example, in FIG. 4. In some embodiments, the tile cover 2602 of the tile MIDC 402f may extend over each of the surfaces of the receiving panel 208 that the tile MIDC 402f is placed on. The tile cover 2602 may comprise a zipper for closure of the tile cover 2602. In embodiments, the tile cover 2602 may be made of a suitable flexible material that is configured to conform to a shape of the tile MIDC 402f. As previously described, the tile MIDC 402f can include a tile cover 2602 comprising material such as carpet, wood, metal, linoleum and/or other suitable tile material according to the preferences of users of the modular system. The tile cover 2602 may comprise a color scheme in accordance with user preferences. In some embodiments, the color scheme may be a checkboard color scheme.

Figure 27:
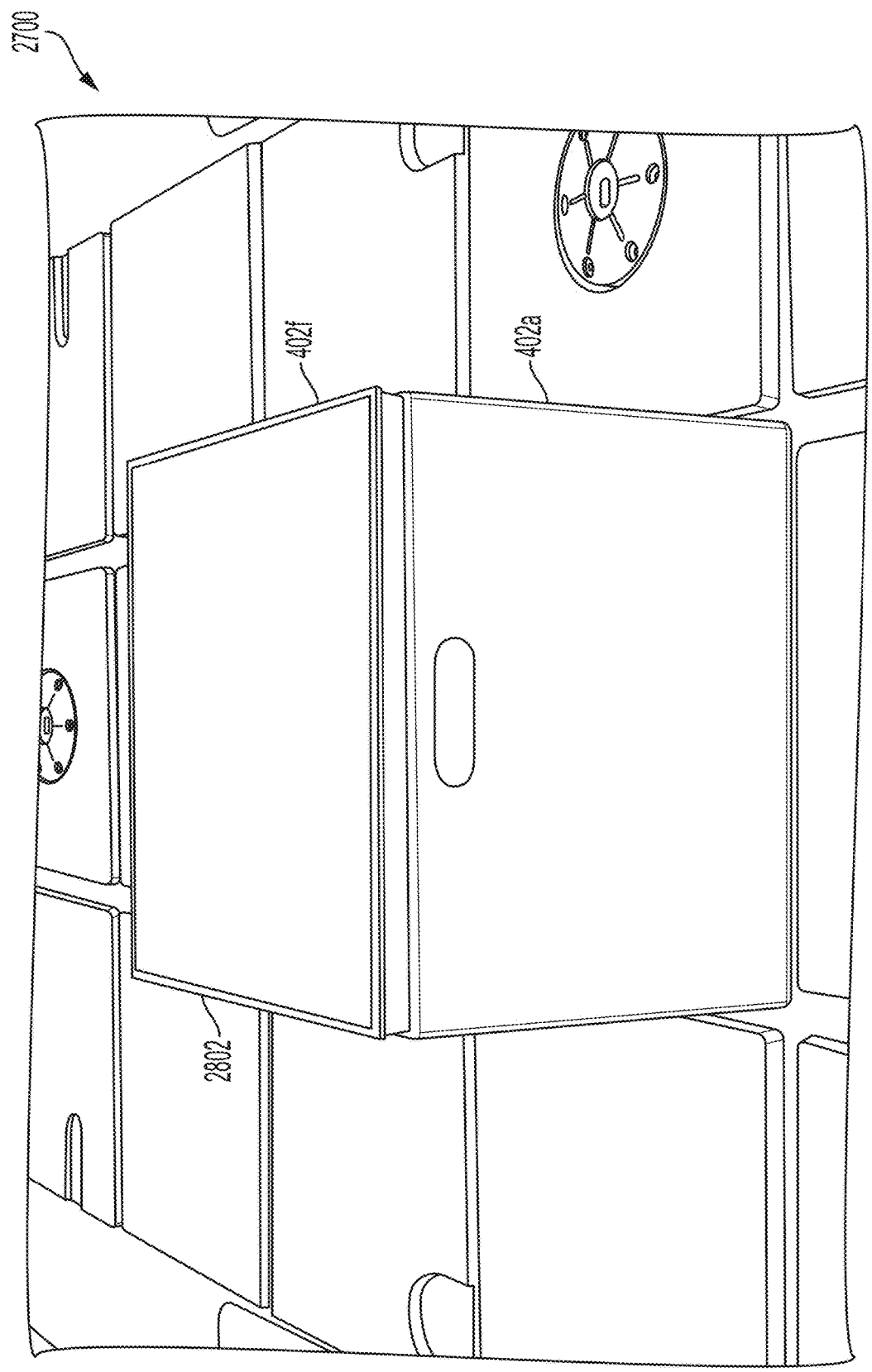

FIG. 27 shows a view 2700 of the tile MIDC 402f placed on a basic storage MIDCs 402a. As previously described, the tile cover 2602 of the tile MIDC 402f may cover the entire top surface 406 of the basic storage MIDC 402a. In various embodiments, the tile MIDC 402f is for placement on apex MIDCs 402, such as those MIDCs 402 that are located at the top of a stack of MIDCs 402 or that do not have any other MIDCs 420 stacked thereon. Specifically, the tile MIDC 402f may be for aesthetic user preferences such that a modular layout does not comprise an apex MIDC 402 with a visible raised interior surface 404.

Figure 28:
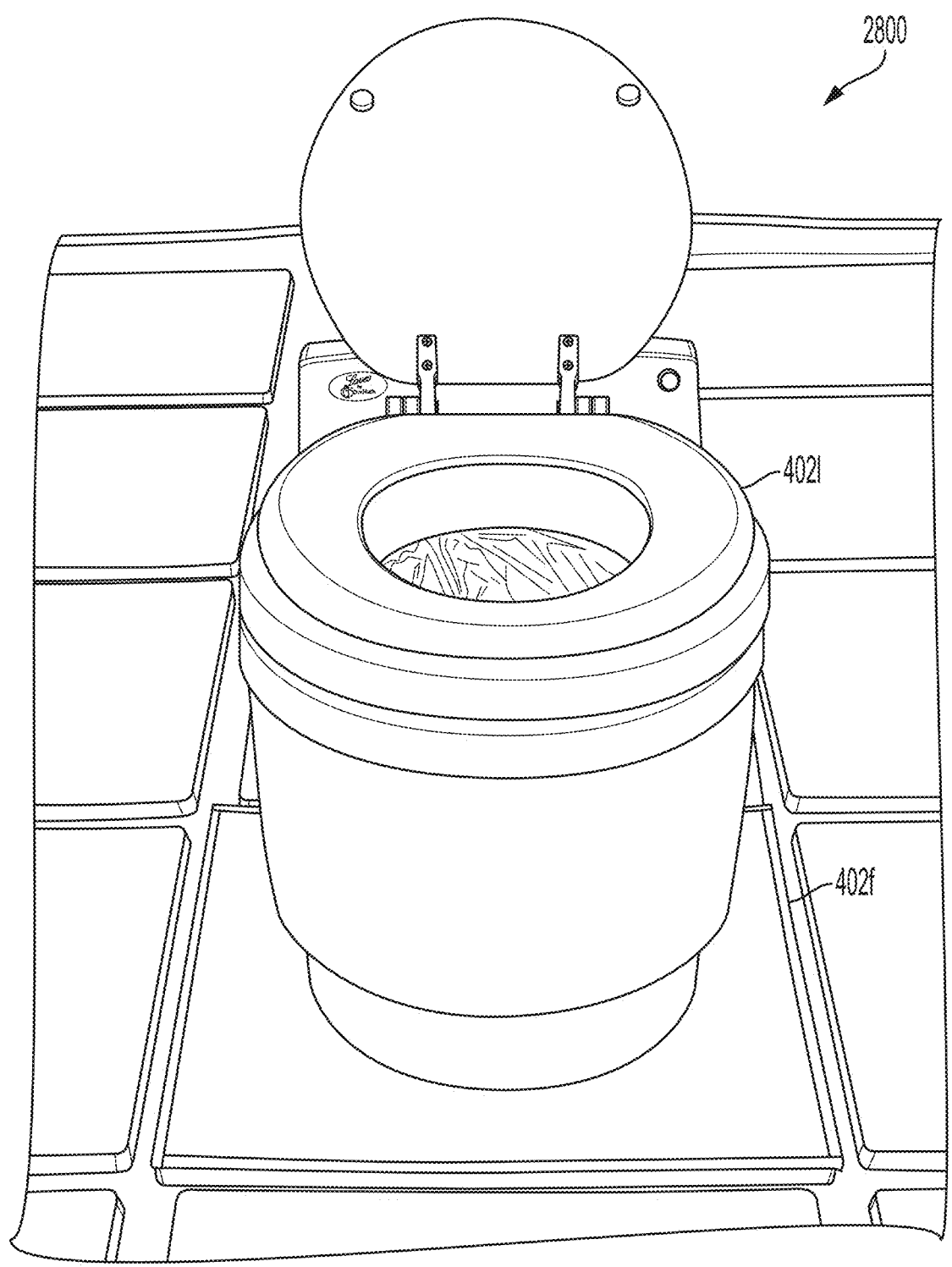

FIG. 28 shows a view 2800 of a commode MIDC 402h stacked on a receiving panel 208. As shown in FIG. 28, the lower portion of the commode MIDC 402h may include a tile or covering portion 402f placed over the panel 208. The tile or covering portion 402f may be connected to the commode portion or the commode may be placed on top of a tile MIDC 402f as shown in FIG. 26. The commode 402h is for sanitation needs. In embodiments, the commode MIDC 402h comprises a commode, such as a portable toilet. In other embodiments, the commode MIDC 402h comprises a housing to house the portable toilet within the interior of the commode MIDC 402h. The commode MIDC 402h may comprise a base of length and width dimensions such that the base fits within the area of the receiving panel 208. For example, the base of the commode MIDC 402h may fit within a twenty inch by twenty inch square. In embodiments, the base of the commode MIDC 402h may engage the raised panel 208 to secure and couple the commode MIDC 402h to the receiving panel 208. As previously described with reference to FIG. 12, the commode MIDC 402h may comprise a portable toilet for sanitation needs.

Figure 29:
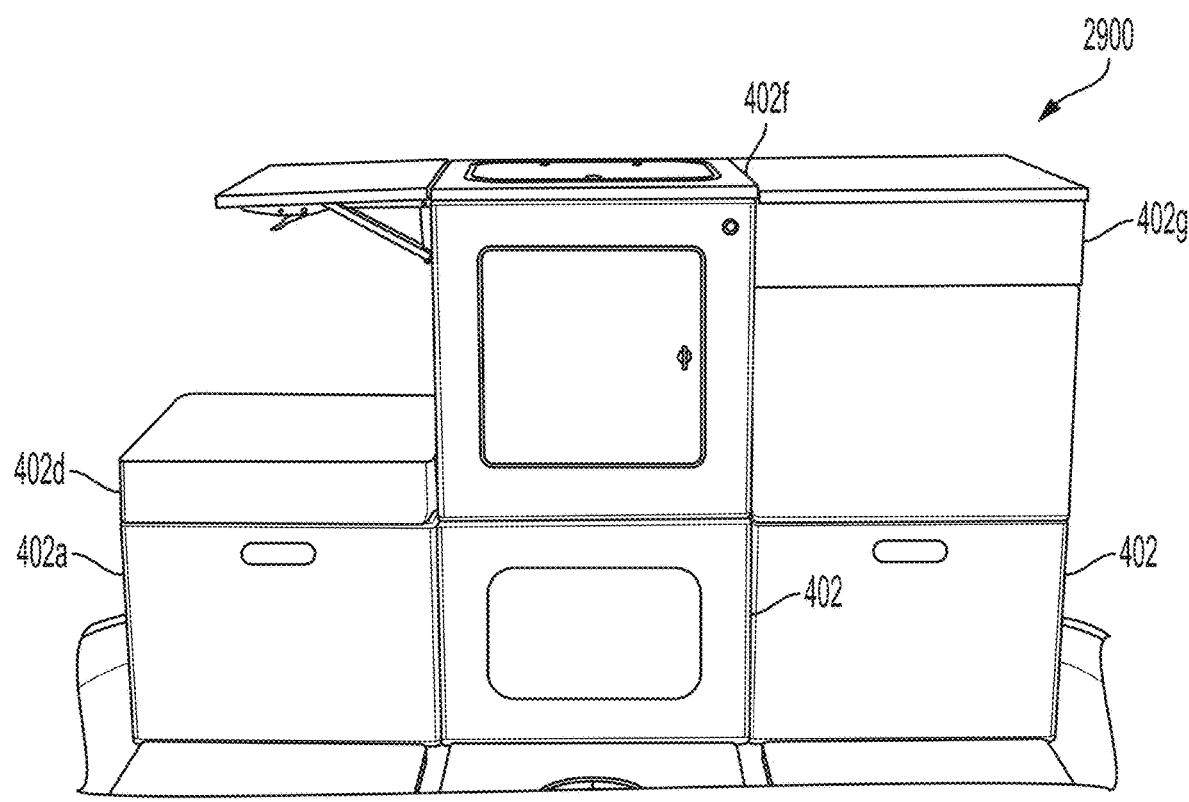
FIGS. 29-30 show exemplary modular layouts according to various embodiments of the present invention.
Figure 30:
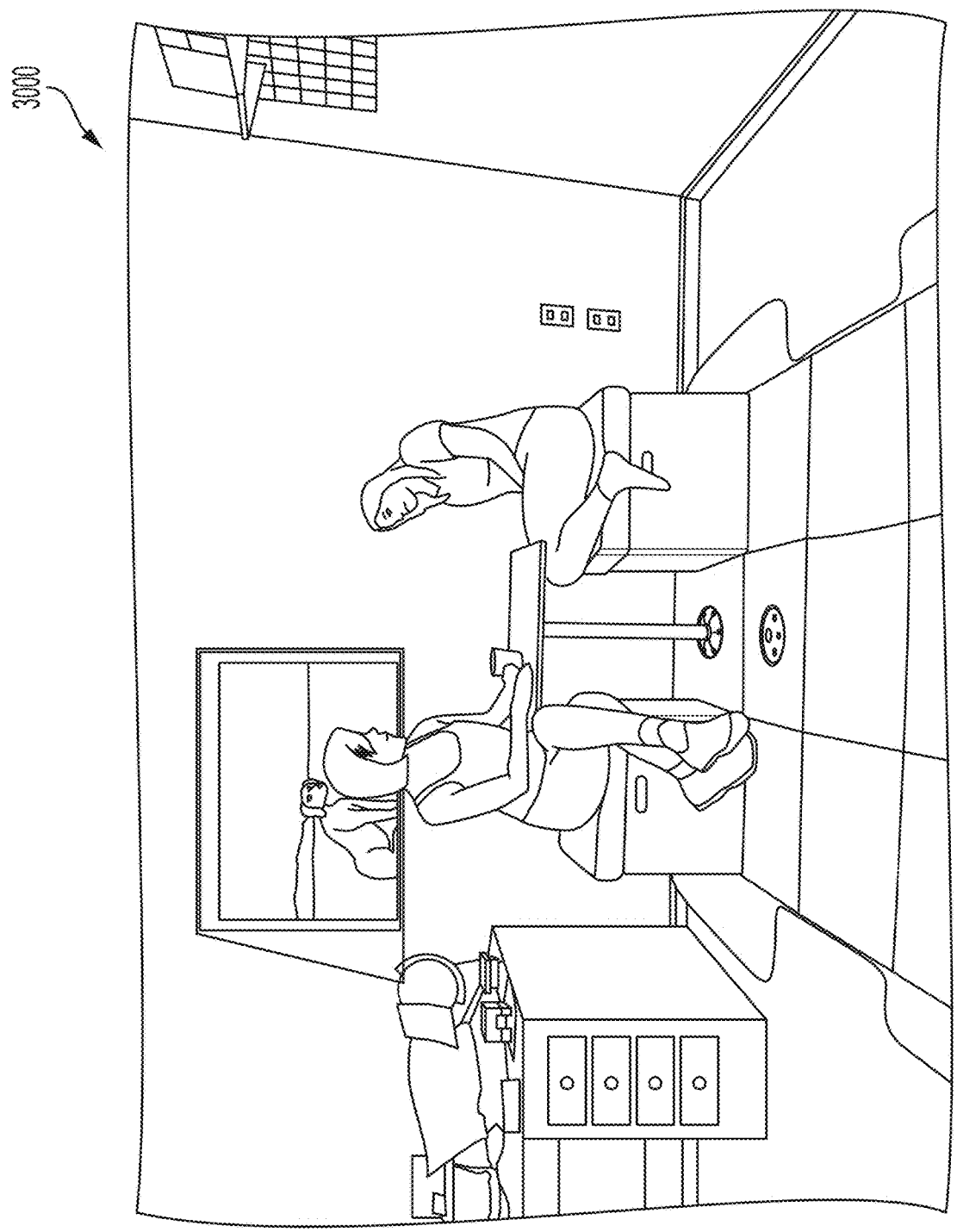

FIG. 29 shows a modular layout 2900 which comprises four basic storage MIDCs 402a, a sink MIDC 402i, a cushion MIDC 402d, and a countertop MIDC 402g. In various embodiments, three of the basic storage MIDCs 402a are each disposed on a receiving panel 208. The three basic storage MIDCs 402a can be adjacent. The cushion MIDC 402d can be placed on the top surface of the left positioned basic storage MIDC 402a of the three basic storage MIDCs 402a. The sink MIDC 402i can be stacked on the center positioned basic storage MIDC 402a. The countertop MIDC 402g can be stacked on the right positioned basic storage MIDC 402a. FIG. 30 shows a view 3000 of the modular floor surface 204, array 206 of receiving panels 208, various MIDCs 402 and user of the modular system outside of a vehicle 100. The various MIDCs 402 may include tile MIDCs 402f, cushion MIDCs 402d stacked on basic storage MIDCs 402a, and table top MIDCs 402e. As previously described, use of the modular system is not limited to vehicle 100, but can be used in other applications for modular furniture as needed.

In some embodiments, the raised panel 208 may be a rectangular shape. Alternatively, the raised panel 208 may be any other suitable shape as long as the shape of the raised panel 208 matches the shape of MIDCs 402 to be placed on the panel 208. In various embodiments, MIDCs 402 may be disengaged from snug friction fits with other MIDCs 402 such that stacked or coupled MIDCs 402 may be decoupled to deconstruct a particular modular layout. Similarly, MIDCs 402 may be disengaged from snug friction fits with raised panels 208 such that MIDCs 402 placed on a raised panel 208 may be moved. Any suitable material may be used to construct the MIDC 402, such as fiberglass. In some embodiments, materials appropriate for the function of a particular MIDC 402 may be used. In some examples, a countertop MIDC 402g can be constructed with wooden material, a sink MIDC 402i can be constructed with a waterproof or water resistant material, a storage MIDC 402a can be constructed with a suitable durable material that will withstand the associated strains and stresses of MIDC 402 stacking. A MIDC 402 constructed with a particular material may be at least partially formed from or covered with the particular material. In various embodiments, any of the side surfaces 408 of a first MIDC 402 also comprise recessed interior surfaces 604 or raised interior surfaces 404 to engage other side surfaces 408 of an adjacent second MIDC 402. For example, the recessed interior surface 604 of the left side surface 408 of the first MIDC 402 may engage the raised interior surface 404 of the right side surface 408 of the second MIDC 402 to secure and couple the first and second MIDC 402. The engagement may be based on a friction fit, as previously described.

As noted and described the modular floor surfaces 204 and MIDC(s) 402 have been shown with reference to a size and configuration that is used in conjunction with a vehicle 100. In other embodiments, the modular floor surface 204 and MIDCs 402 could be used in any three dimensional space—such as in RVs, boats, airplanes, storage containers, homes, workplaces, buildings, structures, etc.

Figure 31:
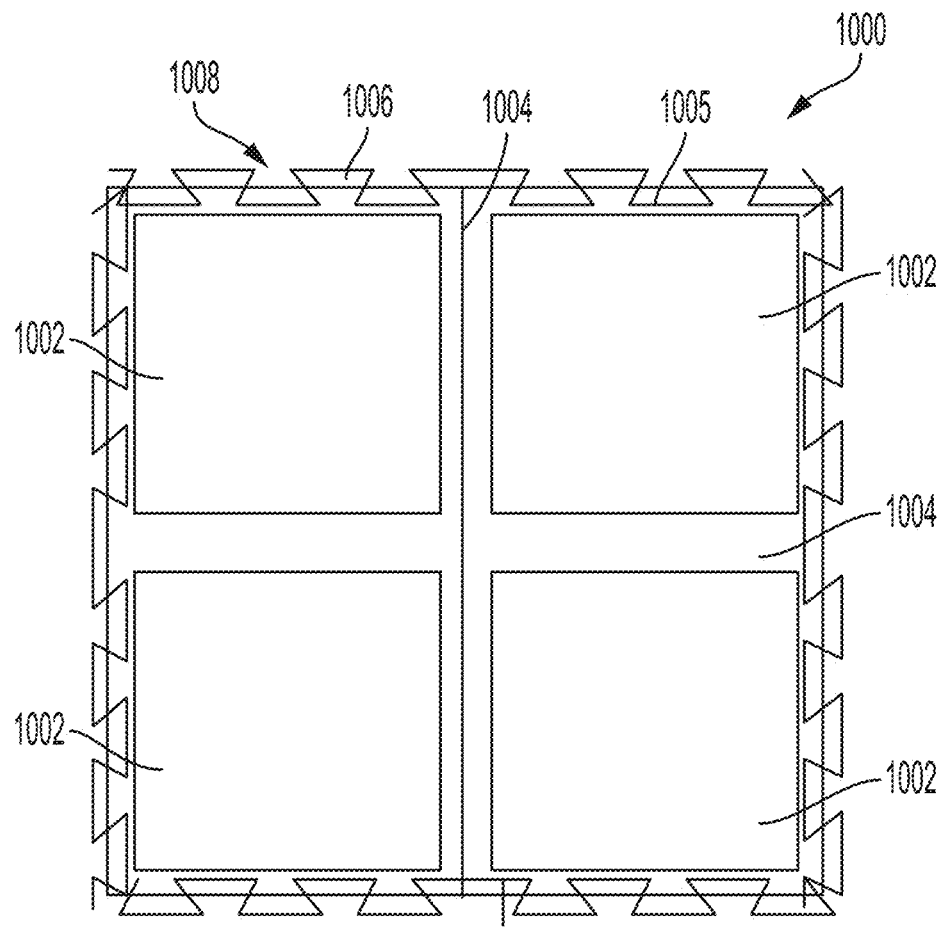
FIG. 31 shows a modular floor panel according to various embodiments of the present invention.

The modular floor surface 204 may be fabricated from a single, monolithic material, such as honeycomb fiberglass, such that the raised receiving panels 208 and channels 214 are part of one integrated component. In other embodiments, the modular floor surface 204 may comprise a plurality modular floor panels that are connected together to form the floor surface 204. In such an embodiment, the modular floor panels may comprise a thermoplastic material, such as vacuum-formed ABS plastic, or some other suitable material. The modular floor panels may be interconnected using finger or dovetail joints. FIG. 31 shows one modular floor panel 1000 and FIG. 32 shows a plurality of modular floor panels 1000 interconnected to form the modular floor surface 204.

In some embodiments, the top surface of the modular floor panels 1000 may comprise one or more raised receiving panels placed thereon such that a MIDC 402 may be placed on one or more of the receiving panels. For example, the top surface of a modular floor panel may comprise one raised receiving panel (e.g., a 20"×20" panel as described above) or multiple raised floor panels to provide greater flexibility in placing the MIDCs. The example floor panel 1000 shown in FIG. 31 comprises four raised panels 1002 with channels therebetween for placement of the lower edges of the MIDCs 402. For example, a channel 1004 between raised panels 1002 on a modular floor panel 1000 may be wide enough for two lower edges 605 of two separate, adjacent MIDCs 204 to fit therein snugly. Similarly, the floor panel 1000 may comprise an outer channel 1005 that is wide enough to fit one perimeter edge 605 of a MIDC 402. And when two modular floor panels 1000 are adjacent, the outer channels 1005 of the two adjacent modular floor panels 1000 will be adjacent to accommodate two MIDC lower edges 605.

As shown in FIG. 31, the perimeters of the modular floor panel 1000 may a series of protrusions 1006 and opening 1008 for protrusions of an adjacent modular floor panel. That is the openings 1008 may be sized to fit a corresponding protrusion of an adjacent modular floor panel 1000 snugly so that the floor panels 1000 can be interconnected to define the desired shape for the modular floor surface 204. As shown in the example of FIG. 31, the protrusions 1006 and openings 1008 can be wedged (or trapezoid) shaped, although in other embodiments other interconnecting shapes could be used.

Figure 32:
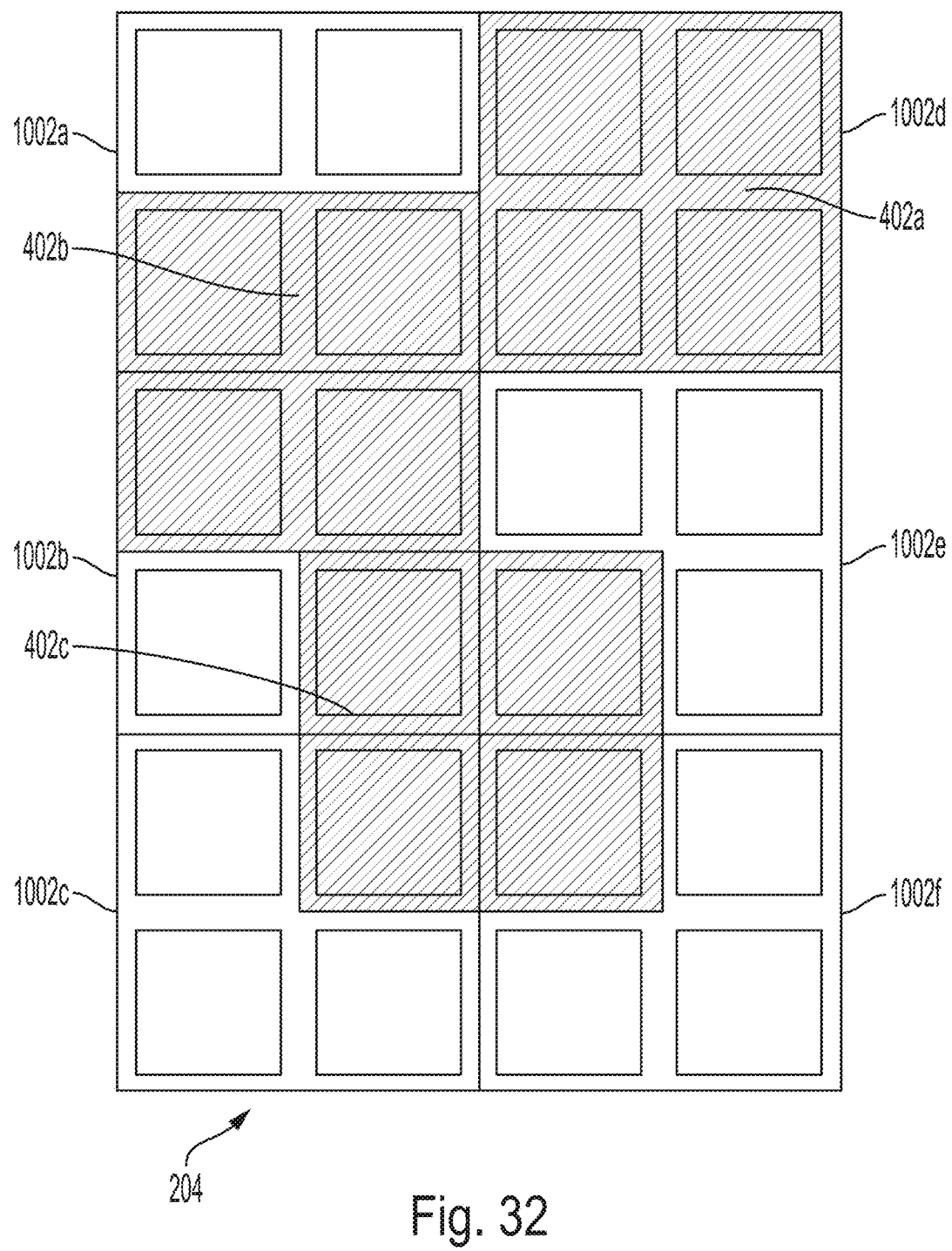
FIG. 32 shows a modular floor surface comprising a plurality of interconnected modular floor panels according to various embodiments of the present invention.

FIG. 32 shows a layout of multiple modular floor surfaces 1000, in this example six modular floor surfaces 1000, interconnected to form the modular floor surface 204 (for clarity, the interconnecting protrusions are not shown between the modular floor surfaces 1000). The user could lay out the modular floor panels 1000 in any desired configuration to achieve a desired shape for the modular floor surface 204, such as L-shaped floor surface, a U-shaped floor surface, a rectangular floor surface (as shown in the example of FIG. 32), or other, desired floor shapes. The MIDCs 402 can be placed on the floor panels 1000 as described above for the monolithic floor surface 204. In embodiments where the modular floor panels 1000 have multiple raised receiving panels 1002 thereon, such as the four raised receiving panels 1002 shown in the example of FIGS. 31 and 32, the user has more flexibility (e.g., resolution) as to where to place the MIDCs 402. For example, the lower recess 604 of the MIDCs 402 could be sized to be placed over any four raised receiving panels 1002. For example, possible MIDC placements are shown in FIG. 32 as hatched rectangles 402a-c. A first MIDC 402a could be placed over the four raised receiving panels 1002 on a single floor panel 1002d. A second MIDC 402b could be placed over two raised receiving panels 1002 over a first floor panel 1002a and two adjacent raised receiving panels 1002 of an adjacent, second floor panel 1002b. Also, another MIDC 402c could be placed over one raised receiving panel from four different floor panels 1002b, 1002c, 1002e, 1002f that joint at a corner.

The modular floor panels 1000, particularly with the multiple raised receiving panels 1002, provide two dimensions of modularity for the user. First, the user can lay out the floor panels 1000 in a desired configuration; the user is not constrained by the shape of a monolithic floor surface 204. Second, user has added flexibility (resolution) as to where to place the MIDCs 402 as described above in connection with FIG. 32. Moreover, it should be noted that in various embodiments, the added resolution for MIDC placement could be used with a monolithic floor surface 204 as well. That is, in the embodiments described above, the MIDCs 402 fit over one raised receiving panel 208 (see, e.g., FIGS. 4-5). In other embodiments, the monolithic floor surface 204 could have 4 times as many receiving panels 208, with the lower recess of the MIDCs 402 fitting over four raised receiving panels 208, much like in FIG. 32, to provide the added MIDC placement resolution for a monolithic floor surface embodiment.

In one general aspect, therefore, the present invention is directed to an apparatus that comprises a modular floor surface 204 comprising an array of raised receiving panels 208, and a plurality of stackable, three-dimensional modular interior design components (MIDCs) 402. The MIDCs 402 are securably and interchangeably placeable over any non-occupied group of one or more storage unit receiving panels 208 of the modular floor surface 204 to create multiple modular floor layouts. In various implementations, each of the MIDCs 402 comprises a lower surface recess 604 that fits over one or more (e.g., 4) of the raised receiving panels. In addition, at least a first MIDC 402 of the plurality of MIDCs 402 has a raised lip 404 on a top surface such that the lower surface recess 604 of a second MIDC 402 of the plurality of MIDCs 402 fits over, separately and interchangeably, at any one time, either (a) one group of one or more raised receiving panels or (b) the raised lip 404 on the top surface of the first MIDC 402.

In various implementations, the raised receiving panels comprise low-profile rectangular-shaped (e.g., including square-shaped) receiving panels such that there are channels 214 between the receiving panels 208. In addition, the lower surface recesses 604 of the MIDCs 402 are rectangular-shaped to receive one or more of the low-profile rectangular-shaped receiving panels 208 such that lower surface perimeter edges 605 of the MIDCs 402 fit into the channels. The plurality of MIDCs 402 may comprise, for example, a storage cube MIDC 402, a commode MIDC 402, a sink MIDC 402, and cooler MIDC 402, a tile MIDC 402, etc. The storage cube MIDC 402 can have a sidewall opening and/or a top surface opening to an interior of the storage cube MIDC 402 to an interior of the storage cube MIDC 402. It could also comprise a hinged door for covering the sidewall opening and/or a removable lid for covering the top surface opening. The modular floor surface 204 may also comprise a post adapter for mounting a post, in which case the apparatus may further comprises a post mounted to the post adapter. It could also include a table top 1202 mounted to the post. The modular floor surface 204 may comprise honeycomb fiberglass.

In another general aspect, the present invention is directed a vehicle with a payload surface 202, where the modular floor surface 204 is installed on the payload surface 202, and the plurality of stackable, three-dimensional modular interior design components (MIDCs) 402 are securably and interchangeably placeable at any nonoccupied storage unit receiving panel 208 of the modular floor surface 204 to create multiple modular floor layouts.

In another general aspect, the present invention is directed a method of creating a modular floor layout. The method comprises the step of placing a first three-dimensional MIDC 402 directly on a first raised receiving panel of an array of raised receiving panels of a modular floor surface 204, wherein the first MIDC 402 is securably and interchangeably placeable at any nonoccupied storage unit receiving panel 208 in the array 206. The method also comprises the step of placing a second three-dimensional MIDC 402 directly on a second raised receiving panel 208 of the array 206, wherein the second MIDC 402 is securably and interchangeably placeable at any nonoccupied storage unit receiving panel 208 in the array 206. The method further comprises the step of placing a third three-dimensional MIDC 402 directly on top of the second MIDC 402 to define a modular floor layout, where the first and second MIDCs 402 each have lower surfaces recesses 604 that fits over the first and second raised receiving panels 208 respectively.

Reference throughout the specification to "various embodiments," "some embodiments," "one embodiment," "an embodiment", "one embodiment," "an embodiment" or the like, means that a particular feature, structure, or characteristic described in connection with the embodiment is included in at least one embodiment. Thus, appearances of the phrases "in various embodiments," "in some embodiments," "in one embodiment", or "in an embodiment", or the like, in places throughout the specification are not necessarily all referring to the same embodiment. Furthermore, the particular features, structures or characteristics may be combined in any suitable manner in one or more embodiments. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Such modifications and variations are intended to be included within the scope of the present invention.

While various details have been set forth in the foregoing description, it will be appreciated that the various embodiments of the present disclosure may be practiced without these specific details. For example, for conciseness and clarity selected embodiments have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, also may mean that two or more elements are not in direct contact with each other, but yet still co-operate or interact with each other.

While particular embodiments of the present subject matter described herein have been shown and described, it will be apparent to those skilled in the art that, based upon the teachings herein, changes and modifications may be made without departing from the subject matter described herein and its broader embodiments and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:

1. A vehicle comprising:
 a payload surface;
 a modular living-space floor surface on the payload surface, wherein the modular living-space floor surface comprises an array of raised receiving floor panels, wherein the raised receiving floor panels are arranged in a grid comprising multiple columns and multiple rows of the raised receiving floor panels, and wherein the floor surface comprises channels between each of the raised receiving floor panels, wherein the channels are at a lower level of the floor surface relative to upper surfaces of the raised received floor panels;
 a plurality of stackable, three-dimensional modular interior design components (MIDCs) that are securably and interchangeably placeable at any nonoccupied storage unit receiving floor panel of the modular living-space floor surface to create multiple modular floor layouts, wherein:
  a bottom surface of each MIDC comprises a perimeter edge and an interior recessed portion;
  a width of the perimeter edge of each MIDC is less than a width of the channels of the floor surface; and
  a shape of the interior recessed portion of each MIDC matches a shape of the raised receiving floor panels of floor surface;
  such that when any of the MIDCs is placed over at least one of the raised receiving panels, the perimeter edge of the MIDC is disposed in a portion of the channels of the floor surface and the matching shapes of the interior recessed portion of the MIDC and the at least one raised receiving floor panel secures the MIDC to the raised receiving floor panel.

2. The vehicle of claim 1, wherein the modular living-space floor surface comprises fiberglass.

3. The vehicle of claim 2, wherein the modular living-space floor surface comprises a monolithic fiberglass floor surface with integrated raised receiving panels.

4. The vehicle of claim 3, wherein the interior recessed portion of each MIDC is sized to fit over one, and only one, raised receiving panel of the living-space floor surface at a time.

5. The vehicle of claim 3, wherein the interior recessed portion of each MIDC is sized to fit over four, and only four, raised receiving panels of the living-space floor surface at a time.

6. The vehicle of claim 1, wherein the modular living-space floor surface comprises a plurality of interconnected floor panels, wherein each of the floor panels comprises one or more raised receiving panels.

7. The vehicle of claim 6, wherein: each of the floor panels comprises one raised receiving panel; and the interior recessed portion of each MIDC is sized to fit over one, and only one, raised receiving panel of the living-space floor surface at a time.

8. The vehicle of claim 6, wherein: each of the floor panels comprises four raised receiving panels; and the interior recessed portion of each MIDC is sized to fit over four, and only four, raised receiving panels of the living-space floor surface at a time.

9. The vehicle of claim 1, wherein: at least a first MIDC of the plurality of MIDCs has a raised lip on a top surface such that the interior recessed portion of a second MIDC of the plurality of MIDCs fits over, separately and interchangeably, the raised lip on the top surface of the first MIDC.

10. The vehicle of claim 9, wherein: the raised receiving panels comprise low-profile rectangular-shaped receiving panels; and the interior recessed portion of each MDC is rectangular-shaped to receive one or more of the low-profile rectangular-shaped receiving panels.

11. The vehicle of claim 9, further comprising a cushion for fitting around the raised lip of the first MIDC.

12. The vehicle of claim 1, wherein the plurality of MIDCs comprise: at least one storage cube MIDC; and at least one MIDC selected from the group consisting of a commode MIDC, a sink MIDC, and cooler MIDC, and a tile MIDC.

13. The vehicle of claim 12, wherein the at least one storage cube MIDC has a sidewall opening to an interior of the storage cube MIDC.

14. The vehicle of claim 13, wherein the at least one storage cube MIDC with the sidewall opening further comprises a hinged door for covering the sidewall opening.

15. The vehicle of claim 12, wherein the at least one storage cube MIDC has a top surface opening to an interior of the storage cube MIDC.

16. The vehicle of claim 15, wherein the at least one storage cube MIDC with the top surface opening further comprises a removable lid for covering the top surface opening.

17. The vehicle of claim 1, wherein:
the modular living-space floor surface comprises a post adapter for mounting a post; and
the vehicle further comprises a post mounted to the post adapter.

18. The vehicle of claim 17, further comprising a table top mounted to the post.

* * * * *